US012208777B2

(12) United States Patent
Borgemenke et al.

(10) Patent No.: US 12,208,777 B2
(45) Date of Patent: Jan. 28, 2025

(54) BRAKE-BY-WIRE SYSTEM WITH PRESSURE BALANCED PSU PISTON

(71) Applicant: BWI (Shanghai) Co., Ltd., Shanghai (CN)

(72) Inventors: Daniel Norbert Borgemenke, Springboro, OH (US); Pascal Chaumette, Creteil (FR); David Fredrick Reuter, Beavercreek, OH (US); Dongqiang Luo, Shanghai (CN); Xiaoxu Zhao, Shanghai (CN)

(73) Assignee: BWI (Shanghai) Co., Ltd., Shanghai (CN)

( * ) Notice: Subject to any disclaimer, the term of this patent is extended or adjusted under 35 U.S.C. 154(b) by 383 days.

(21) Appl. No.: 17/579,577

(22) Filed: Jan. 19, 2022

(65) Prior Publication Data
US 2022/0371562 A1 Nov. 24, 2022

Related U.S. Application Data

(60) Provisional application No. 63/192,513, filed on May 24, 2021.

(30) Foreign Application Priority Data

Oct. 25, 2021 (CN) .......................... 202111240577.6

(51) Int. Cl.
*B60T 13/74* (2006.01)
*B60T 13/14* (2006.01)
(Continued)

(52) U.S. Cl.
CPC ............ *B60T 13/62* (2013.01); *B60T 13/142* (2013.01); *B60T 13/686* (2013.01); *B60T 17/02* (2013.01);
(Continued)

(58) Field of Classification Search
CPC ...... B60T 13/745; B60T 13/686; B60T 8/409; B60T 13/142; B60T 13/62; B60T 8/4081;
(Continued)

(56) References Cited

U.S. PATENT DOCUMENTS 3,153,423 A 10/1964 Biello et al.
5,072,752 A 12/1991 Kolchinsky
(Continued)

FOREIGN PATENT DOCUMENTS

CN 107428325 A 12/2017
CN 107438543 A 12/2017
(Continued)

OTHER PUBLICATIONS

First Office Action issued for corresponding Japanese Patent Application 2022-084446 mailed on Jun. 27, 2023.
(Continued)

*Primary Examiner* — Bradley T King
(74) *Attorney, Agent, or Firm* — Dickinson Wright PLLC

(57) ABSTRACT

An electro-hydraulic brake system includes a master cylinder (MC) fluidly coupled to an MC fluid passageway and configured to supply fluid into the MC fluid passageway in response to pressing force on a brake pedal. A pressure supply unit (PSU) includes an electric motor and a PSU piston disposed within a piston bore, the PSU piston is movable through the piston bore by the electric motor and divides the piston bore into a first chamber and a second chamber. A pedal feel emulator (PFE) includes a PFE piston movable through a PFE bore and separating an upper chamber from a lower chamber. Fluid is conveyed from the lower chamber of the PFE to the second chamber of the PSU in response to a compression of the PFE. The MC fluid passageway provides a fluid path from the master cylinder into the upper chamber of the PFE.

11 Claims, 16 Drawing Sheets

(51) Int. Cl.
*B60T 13/62* (2006.01)
*B60T 13/68* (2006.01)
*B60T 17/02* (2006.01)
*B60T 8/40* (2006.01)

(52) U.S. Cl.
CPC ....... *B60T 8/4081* (2013.01); *B60T 2270/402* (2013.01); *B60T 2270/404* (2013.01); *B60T 2270/82* (2013.01)

(58) Field of Classification Search
CPC ......... B60T 2270/402; B60T 2270/404; B60T 2270/82
See application file for complete search history.

(56) References Cited

U.S. PATENT DOCUMENTS

| | | | |
|---|---|---|---|
| 5,836,659 A * | 11/1998 | Feigel | B60T 13/745 |
| | | | 303/DIG. 11 |
| 5,927,825 A | 7/1999 | Schenk et al. | |
| 6,082,831 A | 7/2000 | Hageman et al. | |
| 6,216,729 B1 | 4/2001 | Hambly et al. | |
| 6,517,170 B1 * | 2/2003 | Hofsaess | B60T 8/4081 |
| | | | 303/10 |
| 6,533,369 B2 | 3/2003 | Baumgartner et al. | |
| 9,643,581 B2 | 5/2017 | Yang et al. | |
| 10,232,835 B2 | 3/2019 | Lee et al. | |
| 10,286,885 B2 * | 5/2019 | Choi | B60T 8/4068 |
| 10,583,819 B2 | 3/2020 | Kim et al. | |
| 10,752,227 B2 | 8/2020 | Jung et al. | |
| 10,814,853 B2 | 10/2020 | Ganzel | |
| 10,851,904 B2 | 12/2020 | Jeon et al. | |
| 10,946,846 B2 | 3/2021 | Kim | |
| 11,021,141 B2 | 6/2021 | Jeong et al. | |
| 2010/0259096 A1 | 10/2010 | Rieth et al. | |
| 2014/0354036 A1 * | 12/2014 | Koo | B60T 8/4081 |
| | | | 303/6.01 |
| 2016/0031426 A1 * | 2/2016 | Feigel | B60T 8/4018 |
| | | | 60/545 |
| 2016/0160969 A1 * | 6/2016 | Durix | F16H 25/2454 |
| | | | 74/89.39 |
| 2017/0327098 A1 | 11/2017 | Leiber et al. | |
| 2018/0050670 A1 * | 2/2018 | Feigel | B60T 13/662 |
| 2018/0194337 A1 | 7/2018 | Leiber et al. | |
| 2018/0334148 A1 * | 11/2018 | Feigel | B60T 13/662 |
| 2019/0225205 A1 | 7/2019 | Ganzel | |
| 2019/0367000 A1 | 12/2019 | Lee | |
| 2020/0047727 A1 | 2/2020 | Shimada | |
| 2020/0290576 A1 | 9/2020 | Kobayashi et al. | |
| 2020/0362888 A1 | 11/2020 | Leiber et al. | |
| 2021/0070262 A1 | 3/2021 | Seol | |
| 2021/0261109 A1 * | 8/2021 | Ganzel | B60T 7/042 |
| 2022/0274572 A1 * | 9/2022 | Ganzel | B60T 13/745 |
| 2022/0396255 A1 * | 12/2022 | Schlangen | B60T 17/08 |
| 2023/0119335 A1 * | 4/2023 | Zhao | B60T 13/146 |
| | | | 303/3 |

FOREIGN PATENT DOCUMENTS

| | | |
|---|---|---|
| CN | 107757589 A | 3/2018 |
| DE | 102017212016 A1 | 1/2019 |
| DE | 102020214119 A1 | 5/2021 |
| KR | 101622146 B1 | 5/2016 |
| WO | 2014131645 A1 | 9/2014 |
| WO | 2018130406 A1 | 7/2018 |
| WO | 2019105628 A1 | 6/2019 |

OTHER PUBLICATIONS

First Office Action issued on Aug. 28, 20232 for counterpart Korean patent application No. 10-2022-0043993, along with the English translation.
Extended European Search Report issued on Nov. 30, 2022 for counterpart European patent application No. 22174633.2.
Second Office Action issued for corresponding Japanese Patent Application 2022-084446 on Oct. 10, 2023.
The First Office Action and search report issued on Oct. 10, 2023 for counterpart Chinese patent application No. 202111240577.6, along with machine EN translation downloaded from EPO.
The First Office Action issued on May 8, 2024 for counterpart European patent application No. 22174633.2.
The Notice of Final Rejection issued on Feb. 26, 2024 for counterpart Korean patent application No. 10-2022-0043993, along with the English translation.

* cited by examiner

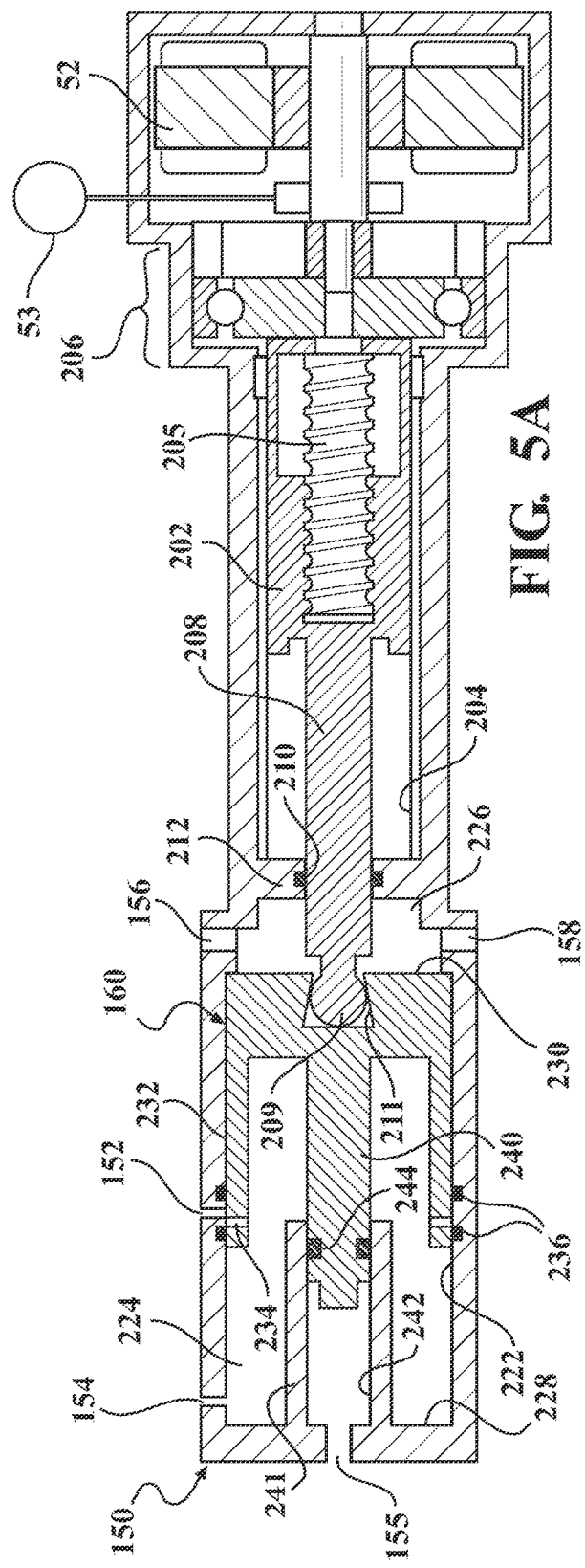
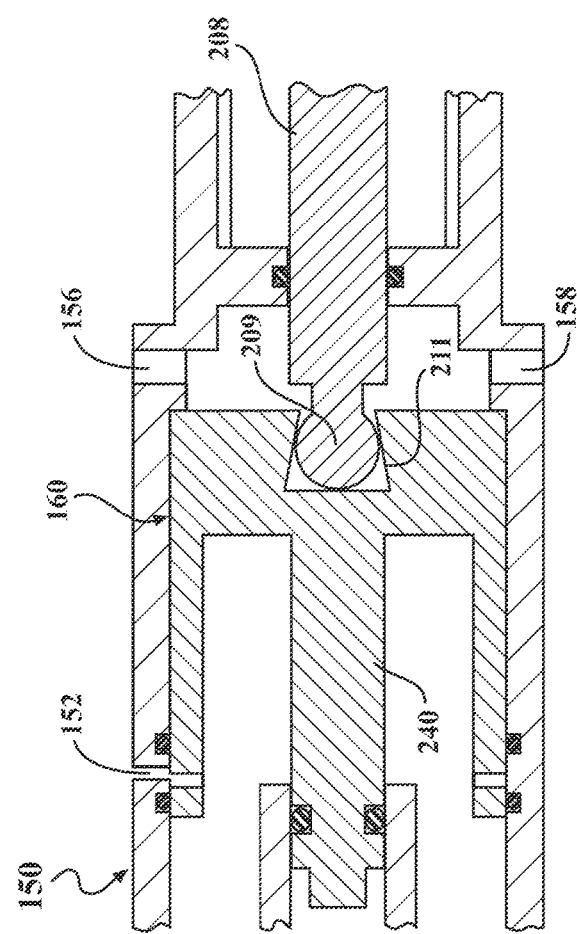
FIG. 5A
FIG. 5B

BRAKE-BY-WIRE SYSTEM WITH PRESSURE BALANCED PSU PISTON

CROSS REFERENCE TO RELATED APPLICATIONS

This U.S. utility patent application claims the benefit of U.S. Provisional Patent Application No. 63/192,513 filed May 24, 2021, and Chinese Patent Application No. 202111240577.6 filed on Oct. 25, 2021, the contents of which are incorporated herein by reference in their entirety.

BACKGROUND OF THE INVENTION

1. Field of the Invention

The present disclosure relates generally to brake systems for vehicles, such as automobiles. More specifically, the present disclosure relates to a brake-by-wire system with a pressure supply unit (PSU) having a pressure-balanced piston.

2. Related Art

As electric and hybrid vehicles continue to proliferate in markets around the world, it is well understood that significant lengthening of battery life can be obtained by utilizing the motor-generator output capabilities of that device during braking. However, the input torque in the generator mode used to recharge batteries is not consistent with driver input function of pedal force/travel verses vehicle deceleration. In order to achieve that complex function, the hydraulic brakes of the vehicle must supply the difference between generator braking torque and driver requested braking torque.

The engineering world has understood this requirement for a number of years commonly known as regenerative brake blending. A most efficient way to achieve this is to use a "brake-by-wire" technique. To accomplish this, the brake pedal in effect becomes a joystick, so it must be connected to a travel and/or force sensor in order to send a signal to the system ECU that will interpret this as driver's intent of a desired vehicle deceleration. In addition, the brake pedal "feel" must be simulated by the appropriate force-travel relationship and must also have the ability to be isolated from directly applying the master cylinder to the wheel brakes.

Brake-by-wire systems typically include a pressure supply unit (PSU) to provide a supply of pressurized fluid for actuating the wheel brakes.

SUMMARY OF THE INVENTION

The present disclosure provides an electro-hydraulic brake system and a control system comprising any feature described, either individually or in combination with any feature, in any configuration.

The present invention provides an electro-hydraulic brake system. The electro-hydraulic brake system comprises a master cylinder (MC) fluidly coupled to a first MC fluid passageway and configured to supply fluid into the first MC fluid passageway in response to pressing force on a brake pedal coupled thereto. The electro-hydraulic brake system also comprises a pressure supply unit (PSU) including an electric motor coupled to an actuator rod, a piston bore including a terminal end opposite the electric motor, and a PSU piston disposed within the piston bore and movable by the actuator rod through the piston bore and dividing the piston bore into a first chamber and a second chamber. The electro-hydraulic brake system also comprises an inner cylinder within the piston bore, the inner cylinder extending from the terminal end and defining a balance bore. The PSU piston includes a balance piston extending into the balance bore and having a cross-sectional area equal to a cross-sectional area of the actuator rod. The electro-hydraulic brake system also comprises a check valve configured to allow fluid flow from the second chamber of the PSU to the first chamber of the PSU and to block fluid flow in an opposite direction. The electro-hydraulic brake system also comprises a pedal feel emulator (PFE) including a PFE piston movable through a PFE bore and separating an upper chamber from a lower chamber. The lower chamber of the PFE is fluidly coupled to the second chamber of the PSU to convey fluid from the lower chamber of the PFE to the second chamber of the PSU in response to a compression of the PFE. The first MC fluid passageway is fluidly coupled to the upper chamber of the PFE to provide a fluid path from the master cylinder into the upper chamber of the PFE.

The present invention also provides a pressure supply unit (PSU) for an electro-hydraulic brake system. The pressure supply unit comprises an electric motor; and a piston bore including a terminal end opposite the electric motor. The pressure supply unit also comprises a PSU piston disposed within the piston bore. The PSU piston is movable through the piston bore by the electric motor and dividing the piston bore into a first chamber and a second chamber, the first chamber extending between the PSU piston and the terminal end. The pressure supply unit also comprises a first supply port in fluid communication with the first chamber for discharging fluid therefrom in response to the PSU piston moving through the piston bore toward the terminal end. The pressure supply unit also comprises an inner cylinder within the piston bore and extending from the terminal end and defining a balance bore. The PSU piston includes a balance piston extending through the first chamber and into the balance bore.

The present invention also provides an electro-hydraulic brake system. The electro-hydraulic brake system comprises a single-circuit master cylinder (MC) having a single piston and fluidly coupled to a MC fluid passageway and configured to supply fluid into the MC fluid passageway in response to pressing force on a brake pedal coupled thereto. The electro-hydraulic brake system also comprises a pressure supply unit (PSU) including an electric motor and a PSU piston disposed within a piston bore. The PSU piston is movable through the piston bore by the electric motor and divides the piston bore into a first chamber and a second chamber, the piston bore including a terminal end opposite the electric motor. The electro-hydraulic brake system also comprises a PSU fluid passageway for conveying fluid from the pressure supply unit to at least one wheel brake. The PSU includes a first supply port in fluid communication with the first chamber for conveying fluid therefrom and to the PSU fluid passageway in response to the PSU piston moving through the piston bore toward the terminal end. The PSU also includes a second supply port in fluid communication with the second chamber for discharging fluid therefrom and to the PSU fluid passageway in response to the PSU piston moving through the piston bore away from the terminal end.

BRIEF DESCRIPTION OF THE DRAWINGS

Further details, features and advantages of designs of the invention result from the following description of embodiment examples in reference to the associated drawings.

FIG. 5A shows a cut-away diagram of a pressure supply unit (PSU), in accordance with an aspect of the present disclosure;

FIG. 5B shows an enlarged section of the cut-away diagram of FIG. 5A;

DESCRIPTION OF THE ENABLING EMBODIMENTS

Figure 1:
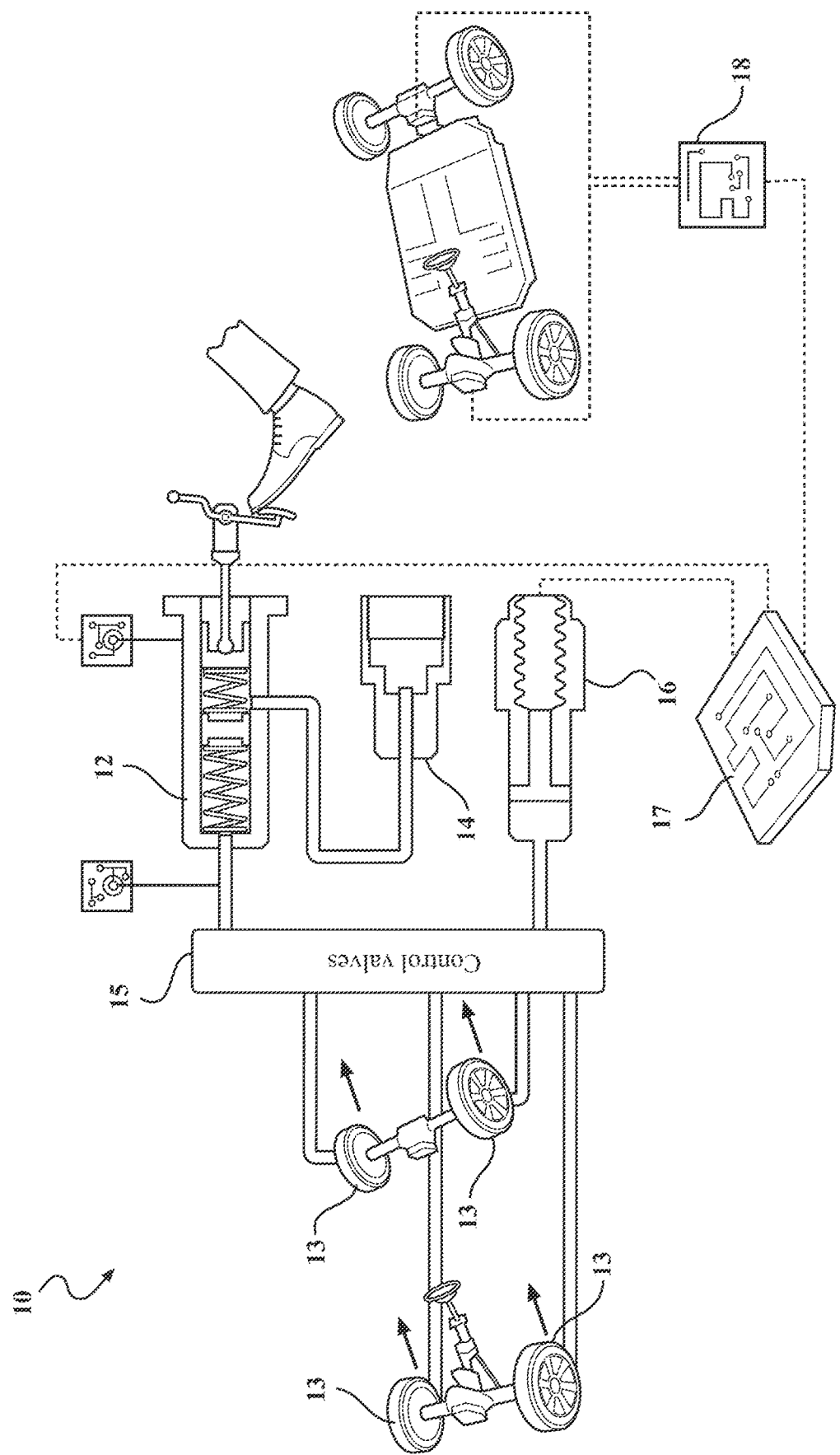
FIG. 1 shows a schematic block diagram of a brake-by-wire system in a vehicle.

Referring to the drawings, the present invention will be described in detail in view of following embodiments.

FIG. 1 shows a schematic block diagram of a brake-by-wire system 10 in a vehicle, such as an automobile. Basic brake-by-wire (BBW) architecture is now well-established in the automotive industry. The vehicle's master cylinder 12 either applies the brakes directly in a failed system fallback mode or is isolated from the wheel brakes 13 and connected to a pedal feel emulator 14 that replicates force, travel, and damping of a traditional brake system. The brake pedal travel and/or force, and/or brake pressure is used by the system 10 as an input signal to a brake electronic control unit (ECU) 17. It in turn sends the appropriate signal to a pressure supply unit (PSU) 16. The PSU 16 may include a high efficiency brushless motor and ballscrew assembly displacing one or two pistons, which can be thought of as an electric master cylinder. The master cylinder 12 and/or the PSU 16 may be coupled to the wheel brakes 13 via a series of control valves 15, which may include an apply valve and a release valve (not shown) for each of the wheel brakes 13 to provide functions such as antilock braking (ABS), electronic traction control, etc.

The brake pedal inputs define driver intent which determines how fast and how hard the brakes are applied with the goal to replicate the feel of a conventional vacuum booster brake system. The brake ECU 17 may also send a signal to a drive control unit (DCU) 18, which may also be called a powertrain control module (PCM), to slow the vehicle using one or more electric motors in a regenerative mode.

Figure 2:
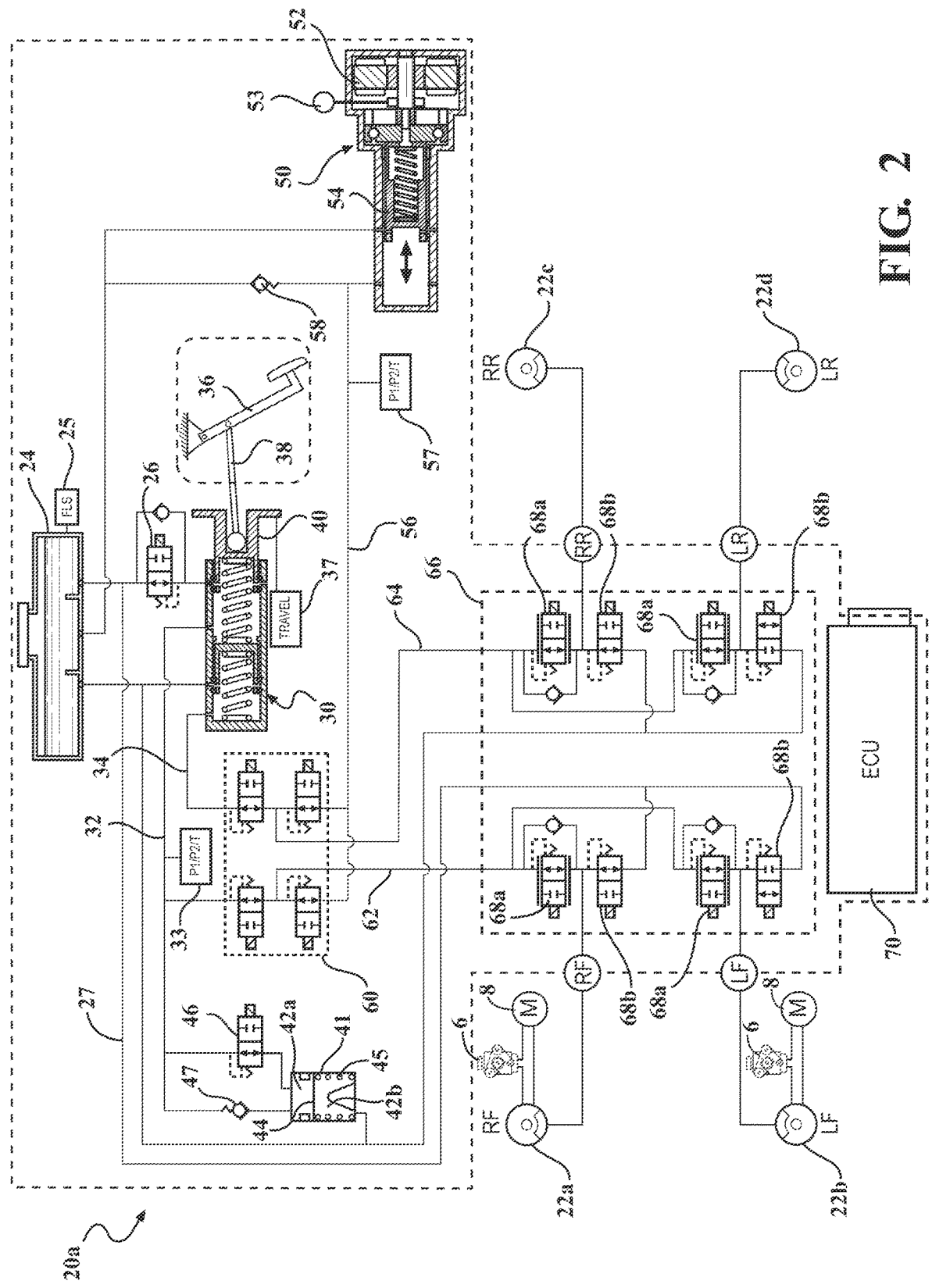
FIG. 2 shows a schematic diagram of a conventional H-bridge type brake-by-wire system.

FIG. 2 shows a schematic diagram of a conventional H-bridge circuit 60 as part of a brake-by-wire (BbW) system 20a for controlling operation of the wheel brakes 22a, 22b, 22c, 22d of the vehicle. One or more of the wheels of vehicles using BbW systems may be powered by an internal combustion engine 6. Additionally or alternatively, one or more of the wheels of vehicles using BbW systems may be powered by an electric motor 8, such as with pure electric vehicles. Additionally or alternatively, and as is the case with some hybrid vehicles, one or more of the wheels of vehicles using BbW systems may be powered by both an electric motor 8 and an internal combustion engines 6 in a sharing configuration. Most vehicle using BbW systems fall into the latter two categories. An example of a sharing configuration is shown in FIG. 2, with the two front wheels each being coupled to an internal combustion engine 6 and an electric motor 8. However, this is merely an example, and other configurations may be used, including any or all of wheels being driven by either or both of the internal combustion engine 6 and/or the electric motor 8. Furthermore, either or both of the internal combustion engine 6 and/or the electric motor 8 may be configured to drive any number of the wheels, e.g. through a direct-drive, a differential, and/or other powertrain components.

The H-Bridge type of BbW system 20a includes a fluid reservoir 24 holding a hydraulic fluid and supplying the hydraulic fluid to a dual-circuit master cylinder 30. A fluid level sensor 25, such as a float switch, monitors a level of the hydraulic fluid in the fluid reservoir 24. A reservoir test valve 26 selectively controls fluid flow from the fluid reservoir 24 to the dual-circuit master cylinder 30. The dual-circuit master cylinder 30 is configured to supply fluid pressure in each of a first master cylinder (MC) fluid passageway 32 and a second MC fluid passageway 34 in response to application of a brake pedal 36. The brake pedal 36 is coupled to press a brake linkage 38 which, in turn, presses a primary piston 40 of the dual-circuit master cylinder 30. The MC fluid passageways 32, 34 may be fluidly isolated from one another to provide redundancy in case of a failure, such as a leak, in in of the two MC fluid passageways 32, 34. A travel sensor 37 monitors a position of the brake pedal 36. A first pressure sensor 33 monitors the pressure in the first MC fluid passageway 32.

A pedal feel emulator (PFE) 41 includes a PFE bore 42. A PFE piston 44 is slidably disposed within the PFE bore 42 to divide the PFE bore 42 into an upper chamber 42a and a lower chamber 42b. The PFE piston 44 is biased by a spring 45 to compress the upper chamber 42a. The upper chamber 42a is selectively fluidly coupled to the first MC fluid passageway 32 via a PFE isolation valve 46 to selectively provide a natural feeling of brake operation, particularly when the dual-circuit master cylinder 30 is decoupled from operating the wheel brakes. A first check valve 47 is connected in parallel with the PFE isolation valve 46 to allow fluid flow from the PFE 41 back to the first MC fluid passageway 32 while preventing fluid flow in a reverse direction. The lower chamber 42b is fluidly coupled to the fluid reservoir 24 via a return fluid passageway 27.

A pressure supply unit (PSU) 50 includes an electric motor 52 and a PSU pump 54 to supply the hydraulic fluid from the fluid reservoir 24 to a PSU fluid passageway 56. A rotor angle sensor 53 may be coupled to the electric motor 52 to determine a position of the rotor in the motor, and thus a position of the PSU pump 54. A second check valve 58 allows fluid flow from the fluid reservoir 24 into the PSU fluid passageway 56 while blocking fluid flow in an opposite direction. A second pressure sensor 57 monitors the pressure in the PSU fluid passageway 56.

This hydraulic layout includes an H-bridge circuit 60 having four valves that control the switching between the MC fluid passageways 32, 34 of the dual-circuit master cylinder 30 and the PSU 50. This basic safety circuit of normally-open valves connecting wheel brakes 22a, 22b, 22c, 22d to the dual-circuit master cylinder 30 and normally-closed brakes connecting wheel brakes 22a, 22b, 22c, 22d to the PSU 50 is described in U.S. Pat. No. 6,533,369, which is incorporated herein by reference in its entirety.

A control valve manifold 66 fluidly connects the two brake circuits 62, 64 to the corresponding wheel brakes 22a, 22b, 22c, 22d. The control valve manifold 66 includes an apply valve 68a and a release valve 68b corresponding to each of the wheel brakes 22a, 22b, 22c, 22d to selectively control fluid flow between the corresponding one of the of the wheel brakes 22a, 22b, 22c, 22d and an associated one of the two brake circuits 62, 64. The apply valves 68a and the release valves 68b may collectively be called antilock brake system (ABS) valves for their use in such an ABS. However, the apply valves 68a and the release valves 68b may be used for other functions, such as for traction control and/or for torque vectoring.

Besides the eight standard ABS valves 68a, 68b, and the four H-bridge control valves 60, conventional brake-by-wire systems include two more valves 26, 46, bringing the total to fourteen (14) valves. The PFE isolation valve 46 is a normally-closed valve and its sole purpose is to lock out the PFE 41 in the event of a failed pressure supply unit when master cylinder backup is required. The reservoir test valve 26 may be used to shut off the primary master cylinder return path to the fluid reservoir 24 so that the system may conduct a self-test to make sure the PFE isolation valve 46 is functioning properly. This is extremely important as the pedal may be locked up if the PFE isolation valve 46 were to fail to open when first commanded.

An electronic control unit (ECU) 70 may include one or more processors, microcontrollers, and/or electric circuits for controlling operation of one or more of the valves 60, 68a, 68b, 26, 46 and/or for monitoring one or more sensors 25, 33, 37, 53, 57 and to thereby coordinate operation of the H-Bridge BbW system 20a.

Figure 3:
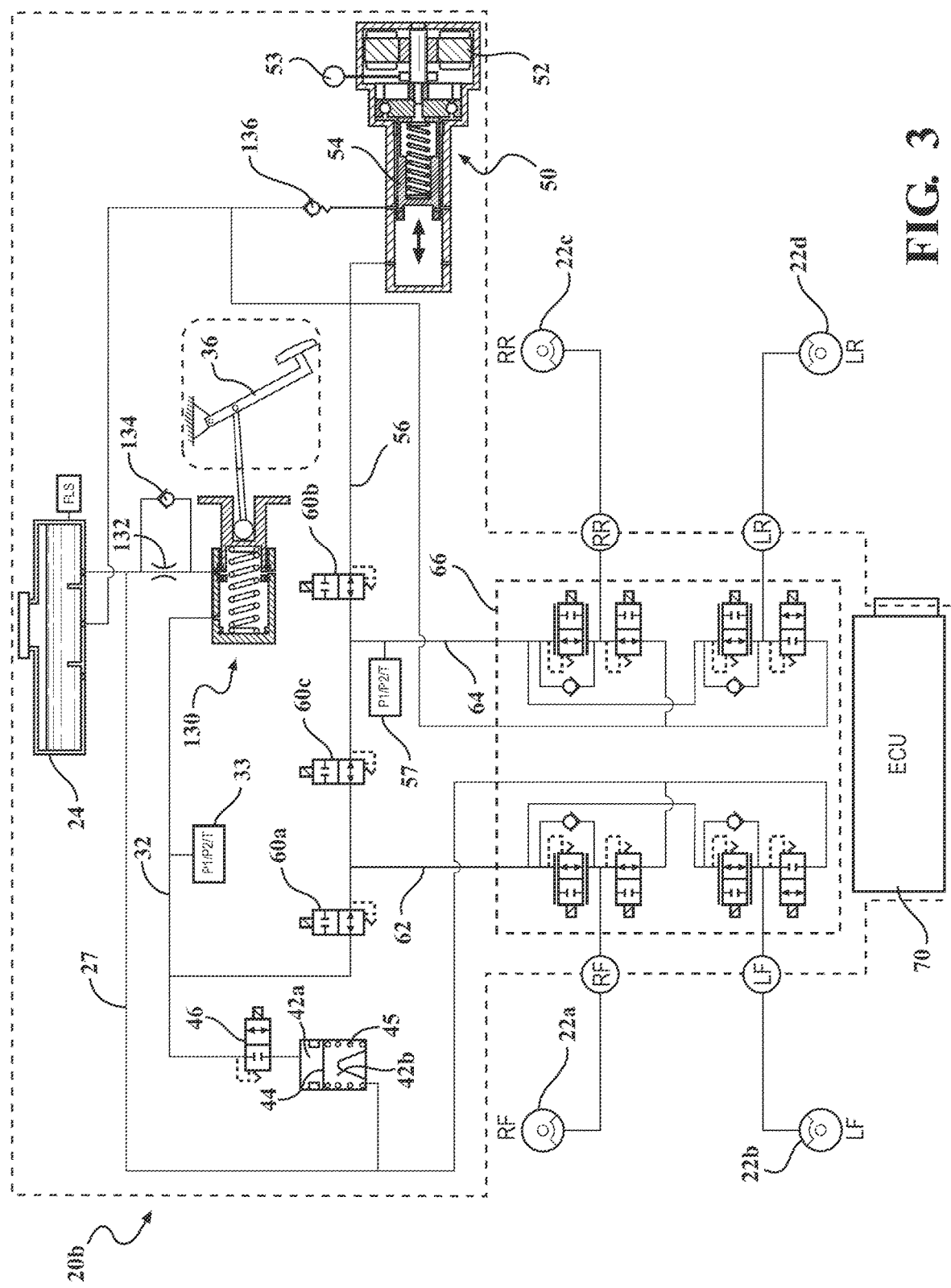
FIG. 3 shows a schematic diagram of a 12-valve brake-by-wire system.

FIG. 3 shows a schematic diagram of a 12-value BbW system 20b. The 12-value BbW system 20b may be similar or identical to the H-Bridge BbW system 20a, except for the changes described herein. The 12-value BbW system 20b may provide some advantages over the H-Bridge BbW system 20a shown in FIG. 2, such as reduced cost, mass, and size while meeting requirements for performance and safety. The 12-value brake-by-wire system 20b includes a single-circuit master cylinder 130 having a single piston, instead of the dual-circuit master cylinder 30 of the H-Bridge BbW system 20a. The single-circuit master cylinder 130 receives hydraulic fluid from the fluid reservoir 24 via parallel combination of a master cylinder (MC) orifice 132 and an MC check valve 134. The single-circuit master cylinder 130 feeds the fluid to a first MC fluid passageway 32 in response to application of the brake pedal 36. A fourth check valve 136 allows fluid flow from the fluid reservoir 24 to the PSU 50 while blocking fluid flow in an opposite direction.

In place of the H-bridge circuit 60, the 12-value BbW system 20b has a 3-value arrangement 60a, 60b, 60c configured to selectively couple either the first master cylinder (MC) fluid passageway 32 or the PSU fluid passageway 56 to one or both of the two brake circuits 62, 64, which, in turn, are fluidly coupled to two of the wheel brakes 22a, 22b, 22c, 22d. The 3-value arrangement 60a, 60b, 60c includes a MC isolation valve 60a configured to selectively fluidly couple the first master cylinder (MC) fluid passageway 32 with the first brake circuit 62. The 3-valve arrangement 60a, 60b, 60c also includes a PSU isolation valve 60b configured to selectively fluidly couple the PSU fluid passageway 56 with the second brake circuit 64. The 3-value arrangement 60a, 60b, 60c also includes a middle circuit connecting valve 60c configured to selectively fluidly couple the first brake circuit 62 with the second brake circuit 64.

The 12-valve BbW system 20b includes a control valve manifold 66 fluidly connecting the two brake circuits 62, 64 to the corresponding wheel brakes 22a, 22b, 22c, 22d. The control valve manifold 66 may be similar or identical to the control valve manifold 66 of the H-Bridge BbW system 20a.

The 12-valve BbW system 20b may provide a reduced performance to achieve the cost, size, and mass reduction also sought after by our industry. There are downsides to this layout as well in that it may only be suited for Front/Rear systems due to a lag that may be caused by the middle circuit connecting valve 60c, and the valves 60a, 60b, 60c will need to be large enough to flow the same fluid carried out by two valves in parallel in the H-bridge circuit 60 of the H-Bridge BbW system 20a.

Figure 4:
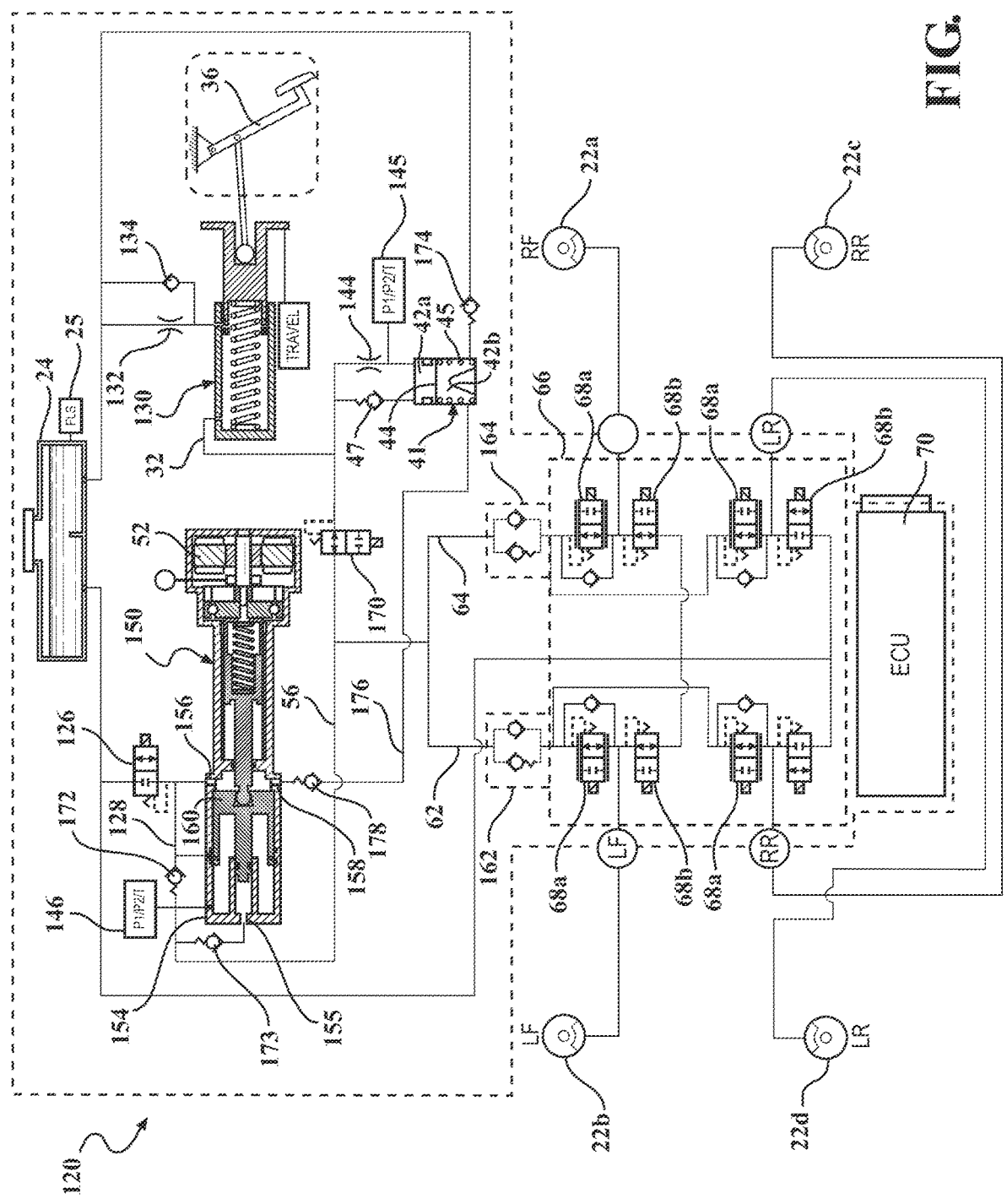
FIG. 4 shows a schematic diagram of a first brake-by-wire system of the present disclosure.

FIG. 4 shows a schematic diagram of a first BbW system 120 of the present disclosure. The first BbW system 120 is a 10-valve system, with a single-circuit master cylinder 130 and a dual-circuit pressure supply unit (PSU) 150 with a pressure-balanced piston 160. It should be appreciated one or more aspects of the first BbW system 120 may be implemented in a brake system having a different number of valves. The first BbW system 120 is significantly different from the conventional BbW systems previously described, as described below.

The first BbW system 120 includes a single-circuit master cylinder 130. Hydraulic fluid can flow from the fluid reservoir 24 into the single-circuit master cylinder 130 via a parallel combination of the MC orifice 132 and the MC check valve 134. The hydraulic fluid is discharged from the single-circuit master cylinder 130 and into the first MC fluid passageway 32 in response to application (i.e. pressing) of the brake pedal 36.

The first BbW system 120 includes the upper chamber 42a of the PFE 41 fluidly coupled to the first MC fluid passageway 32 via a second orifice 144 connected in parallel with a first check valve 47. The first check valve 47 is configured to allow fluid flow from the PFE 41 back to the first MC fluid passageway 32, while preventing fluid flow in a reverse direction. A third pressure sensor 145 monitors fluid pressure in the upper chamber 42a of the PFE 41. A fourth pressure sensor 146 monitors fluid pressure in the PSU fluid passageway 56.

The dual-circuit PSU 150 of the first BbW system 120 includes a first fluid port 152, a second fluid port 154, a third fluid port 155, a fourth fluid port 156, and a fifth fluid port 158. A PSU piston 160 is moved linearly by the electric motor 52 to supply the hydraulic fluid under pressure to the PSU fluid passageway 56 via the second fluid port 154.

The second fluid port 154 may also be called a first supply port because of its function for supplying fluid from the dual-circuit PSU 150 when the PSU piston 160 is extended away from the electric motor 52. The fourth fluid port 156 may also be called a second supply port because of its function for supplying fluid from the dual-circuit PSU 150 when the PSU piston 160 is retracted toward the electric motor 52. The third fluid port 155 may also be called a third supply port because of its function for supplying fluid from the dual-circuit PSU 150 when the PSU piston 160 is extended away from the electric motor 52. A PSU reservoir isolation valve (PRIV) 126, which is a normally-closed valve, selectively controls fluid communication between the fluid reservoir 24 and an intake passage 128 that is fluidly coupled to the first fluid port and the fourth fluid port 156 of the dual-circuit PSU 150.

A PSU replenish check valve 172 is connected between the intake passage 128 and the PSU fluid passageway 56 and configured to allow fluid flow from the intake passage 128 into the PSU fluid passageway 56 while blocking fluid flow in an opposite direction. A PSU balance check valve 173 is connected between the third fluid port 155 and the PSU fluid passageway 56 and configured to allow fluid flow from the third fluid port 155 into the PSU fluid passageway 56 while blocking fluid flow in an opposite direction. In some embodiments, the PSU balance check valve 173 may not be used, and the third fluid port 155 may be directly fluidly coupled to the PSU fluid passageway 56.

The lower chamber 42b of the PFE 41 is connected to the fluid reservoir 24 via a fifth check valve 174. The fifth check valve 174 is configured to allow fluid flow from the fluid reservoir 24 to flow into the PFE 41 while blocking fluid flow in the opposite direction. A makeup conduit 176 is also connected to the lower chamber 42b of the PFE 41. The makeup conduit 176 is connected to the fifth fluid port 158 of the dual-circuit PSU 150 via a sixth check valve 178. The sixth check valve 178 is configured to allow fluid flow from the makeup conduit 176 into the fifth fluid port 158 of the dual-circuit PSU 150 while blocking fluid flow in the opposite direction.

A master cylinder isolation valve (MCIV) 170, which is a normally-open valve, selectively controls fluid communication between the first MC fluid passageway 32 and the PSU fluid passageway 56.

The PSU fluid passageway 56 is directly fluidly connected to each of the first brake circuit 62 and the second brake circuit 64. A first bi-directional check valve 162 controls fluid flow between the PSU fluid passageway 56 and the ABS valves 68a, 68b in the first brake circuit 62, and a second bi-directional check valve 164 controls fluid flow between the PSU fluid passageway 56 and the ABS valves 68a, 68b in the second brake circuit 64. The purpose and operation of the bi-directional check valves 162, 164, is described in further detail, below.

FIG. 5A shows a cut-away diagram of the dual-circuit PSU 150. The dual-circuit PSU 150 includes the electric motor 52 configured to move an actuator nut 202 in a linear path through an actuator bore 204. Specifically, the electric motor 52 rotates a threaded rod 205 to move the actuator nut 202 in the linear path through the actuator bore 204. In some embodiments, the actuator nut 202 may be prevented from rotating, e.g. by a key and slot, as the actuator nut 202 moves in the linear path through the actuator bore 204. In some embodiments, one or more ball bearings may be disposed between the threaded rod 205 and the actuator nut 202, providing a ball-screw interface. A gear set 206, which may include one or more planetary reduction gears, mechanically couples the motor shaft of the electric motor 52 and the threaded rod 205, reducing the speed and increasing torque applied to the threaded rod 205.

An actuator rod 208 is coupled to the actuator nut 202 and extends to a ball end 209 opposite from the electric motor 52. The actuator rod 208 extends through a partition 212 and is sealed by a first O-ring 210. The ball end 209 of the actuator rod 208 fits within a corresponding pocket 211 in the PSU piston 160 with a tight snap fit, thereby allowing the PSU piston 160 to be pushed or pulled by the actuator rod 208. The PSU piston 160 is disposed within a piston bore 222 and configured to move linearly therethrough in response to being pressed by the ball end 209 of the actuator rod 208. The piston bore 222 extends between the partition 212 and a terminal end 228. The PSU piston 160 divides the piston bore 222 into a first chamber 224 and a second chamber 226. The first chamber 224 extends between the terminal end 228 and the PSU piston 160. The interlocking fit between the ball end 209 of the actuator rod 208 fits and the corresponding pocket 211 in the PSU piston 160 may allow the dual-circuit PSU 150 to function without a return spring, which may otherwise be required, providing a cost savings over alternative designs.

The second chamber 226 extends between the PSU piston 160 and the partition 212. The second fluid port 154 provides fluid communication into the first chamber 224 adjacent to the terminal end 228 for fluid to exit from the first chamber 224 in response to the PSU piston 160 being pushed toward the terminal end 228. The fourth fluid port 156, and the fifth fluid port 158 each provide fluid communication into the second chamber 226.

The PSU piston 160 includes a top face 230 that spans across the piston bore 222 and which engages the ball end 209 of the actuator rod 208. The PSU piston 160 also includes cylindrical skirt 232 extending away from the top face 230 and into the first chamber 224 adjacent to the piston bore 222. The cylindrical skirt 232 defines an intake passage 234 that aligns with the first fluid port 152 for allowing fluid into the first chamber 224 with the dual-circuit PSU 150 in a retracted position, as shown in FIG. 5A. A set of second O-rings 236 seal between the piston bore 222 and the PSU piston 160 for preventing the fluid from leaking around the PSU piston 160.

The dual-circuit PSU 150 includes an inner cylinder 241 within the piston bore 222 and extending from the terminal end 228 toward the electric motor 52 and defining a balance bore 242 on an inner surface thereof. The balance bore 242 may be coaxial with the piston bore 222. The PSU piston 160 also includes a balance piston 240 extending opposite from the top face 230 and having a cross-sectional area that is equal to the cross-sectional area of actuator rod 208. The balance piston 240 extends through the balance bore 242. The third fluid port 155 provides fluid communication into the balance bore 242. A third O-Ring 244 extends around the balance piston 240 for sealing with the balance bore 242.

When the driver applies the brake, the master cylinder isolation valve (MCIV) 170 is closed, and the PSU reservoir isolation valve (PRIV) 126 remains opened. Master cylinder fluid is directed to the PFE 41 to simulate normal brake pedal force and travel. That same travel information is sent to the electronic control unit ECU 70 which subsequently applied the appropriate current to the electric motor 52 to rotate the ballscrew and mechanically displace the PSU piston 160. This causes the fluid to travel through the bi-directional check valves 162, 164, through the ABS apply valves 68a and finally reaching the wheel brakes 22a, 22b, 22c, 22d to apply pressure and slow the vehicle.

Since this is an "open" system, meaning the fluid released from the wheel brakes in an ABS stop is not captured but flows back to the reservoir at atmospheric pressure, it is necessary to replenish the PSU. This is accomplished by first closing the PSU reservoir isolation valve (PRIV) 126 which traps pressure behind the PSU piston 160. The ball screw is retracted the actuator rod 208 to pull the PSU piston 160 back away from the terminal end 228. This forces fluid behind the PSU piston 160 to flow to the front of the PSU piston 160 via the replenish check valve 172. Pressure on both sides of the PSU piston 160 is maintained during replenishment since due to the balance piston 240, both sides of the PSU piston 160 now displace equal volumes as the PSU piston 160 moves through the piston bore 222.

The dual-circuit PSU 150 may be filled at an assembly plant using an "evac. and fill" procedure. That is, the entire brake system may be evacuated and then brake fluid added so there is no trapped air. In that case, the balance check valve 173 may have a very low cracking pressure, and the balance bore 242 in front of the balance piston 240 would be filled with fluid. After the first apply, the balance bore 242 in front of the balance piston 240 could not replenish but simply create a partial vacuum.

Alternatively, if an evac. and fill is not used, but a simple pressure or gravity bleed, then a small volume of air may be trapped in the balance bore 242 in front of the balance piston 240. This small volume of air would not impede operation, but would most likely slowly go back into the brake system and be absorbed. In either of the two cases above, the balance bore 242 in front of the balance piston 240 may be maintained at or near atmospheric pressure, so it balances out force applied by the actuator rod 208 on the top side of the PSU piston 160.

FIG. 5B shows an enlarged section of the dual-circuit PSU 150, showing how the ball end 209 of the actuator rod 208 fits within the corresponding pocket 211 in the PSU piston 160. The actuator rod 208 may include a plastic and stamped assembly that fits into the pocket 211 in the PSU piston 160. The ball end 209 may then be snapped and retained into the PSU piston 160 to form a solid couple with substantially high pull-out forces.

Figure 6A:
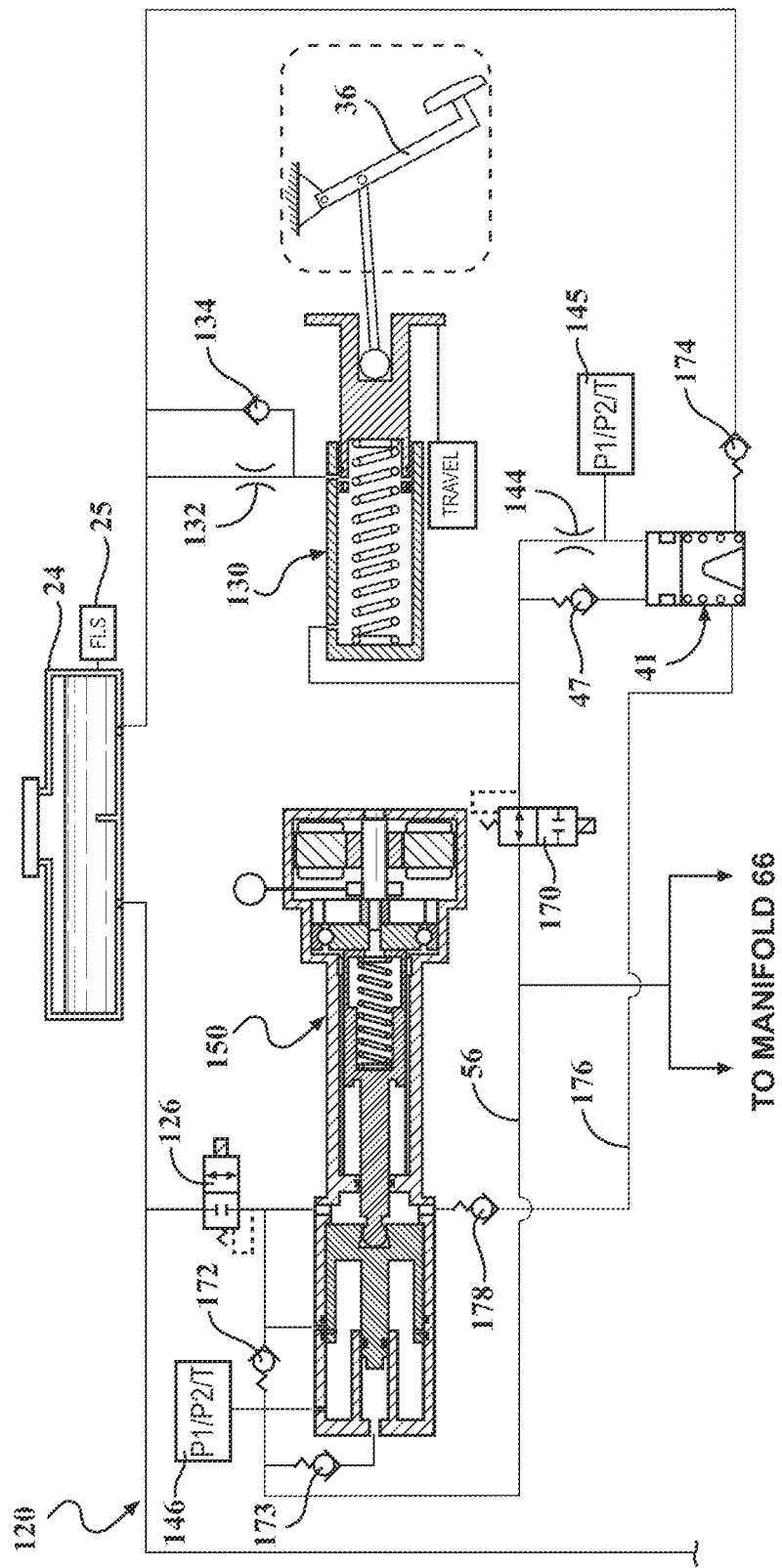
FIG. 6A shows a section of the schematic diagram of the first brake-by-wire system of FIG. 4, indicating a fluid path from the PSU to the ABS valves.
Figure 6B:
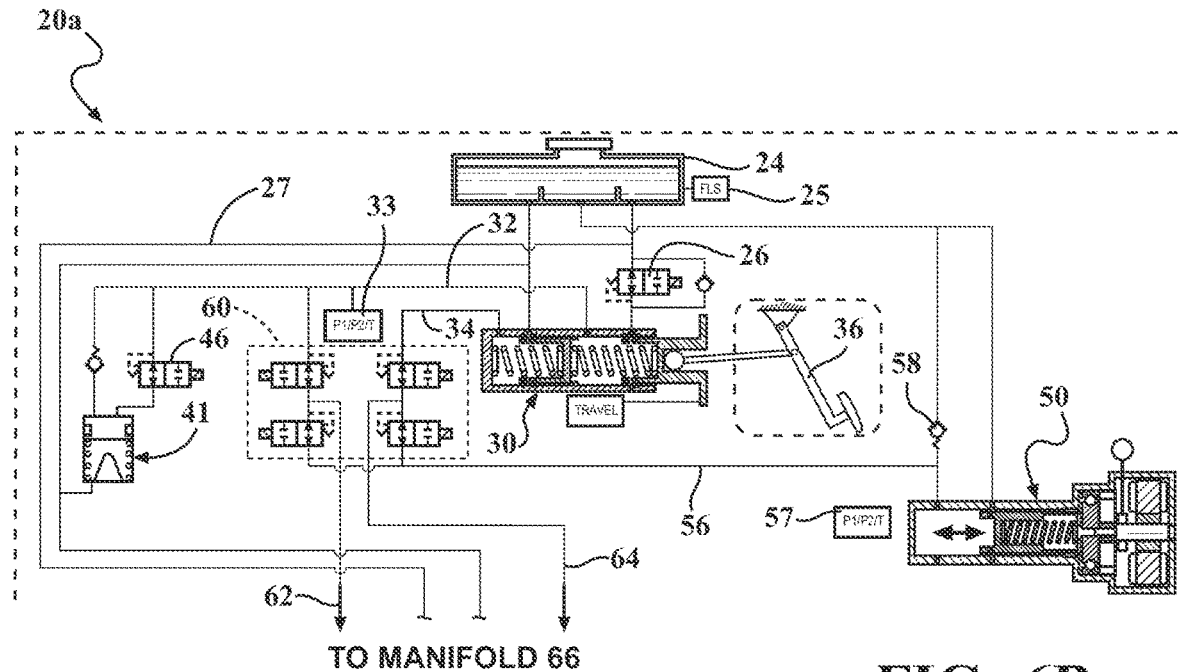
FIG. 6B shows a section of the schematic diagram of the H-bridge type brake-by-wire system of FIG. 2, indicating a fluid path from the PSU to the ABS valves.
Figure 6C:
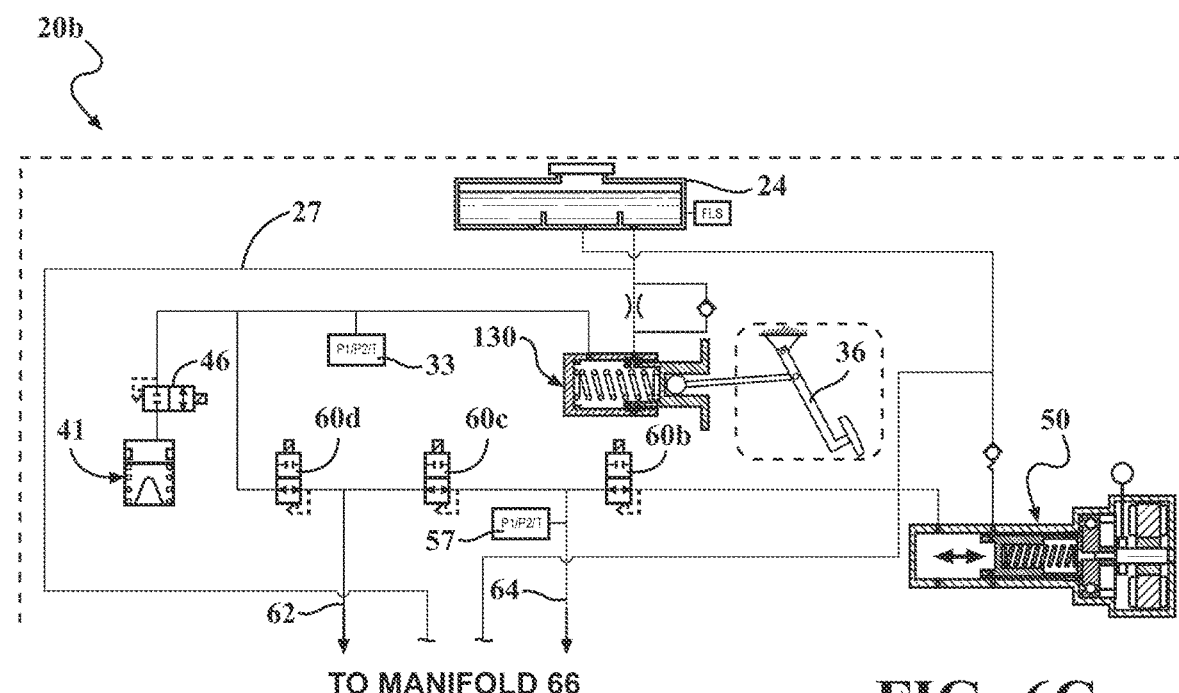
FIG. 6C shows a section of the schematic diagram of the 12-value brake-by-wire system of FIG. 3, indicating a fluid path from the PSU to the ABS valves.

FIG. 6A shows a section of the schematic diagram of the first BbW system 120 of FIG. 4, indicating a fluid path from the dual-circuit PSU 150 to the control valve manifold 66, which may also be called the ABS valves. FIG. 6B shows a section of the schematic diagram of the H-bridge type BbW system 20a of FIG. 2, indicating a fluid path from the PSU 50 to the control valve manifold 66, with the isolation valves in the fluid path between the PSU and the control valve manifold 66 circled. FIG. 6C shows a section of the schematic diagram of the 12-value BbW system 20b system of FIG. 3, indicating a fluid path from the PSU 50 to the control valve manifold 66, with the isolation valves in the fluid path between the PSU 50 and the control valve manifold 66 circled.

These schematics show an advantage of the first BbW system 120 regarding the important aspect of braking response time. In both the H-bridge BbW system 20a and the 12-value BbW system 20b designs, fluid must flow through one or two isolation valves from the PSU 50 to the wheel brakes. In the first BbW system 120, there are no isolation valves between the dual-circuit PSU 150 and the wheel brakes. This gives the first BbW system 120 a distinct advantage in that typical orifice equivalent sizes of valve range from 0.7 to 1.0 which can cause a significant flow restriction, thus reducing braking response time.

It should also be noted that this situation may be worse for the 12-value BbW system 20b, in that by necessity the valve will need to be larger to achieve equivalent flow rates to the parallel valves in the H-bridge BbW system 20a. In addition, this design is may only be applicable to Front/Rear hydraulic base brake splits due to the cross-over valve added flow restriction.

Figure 7A:
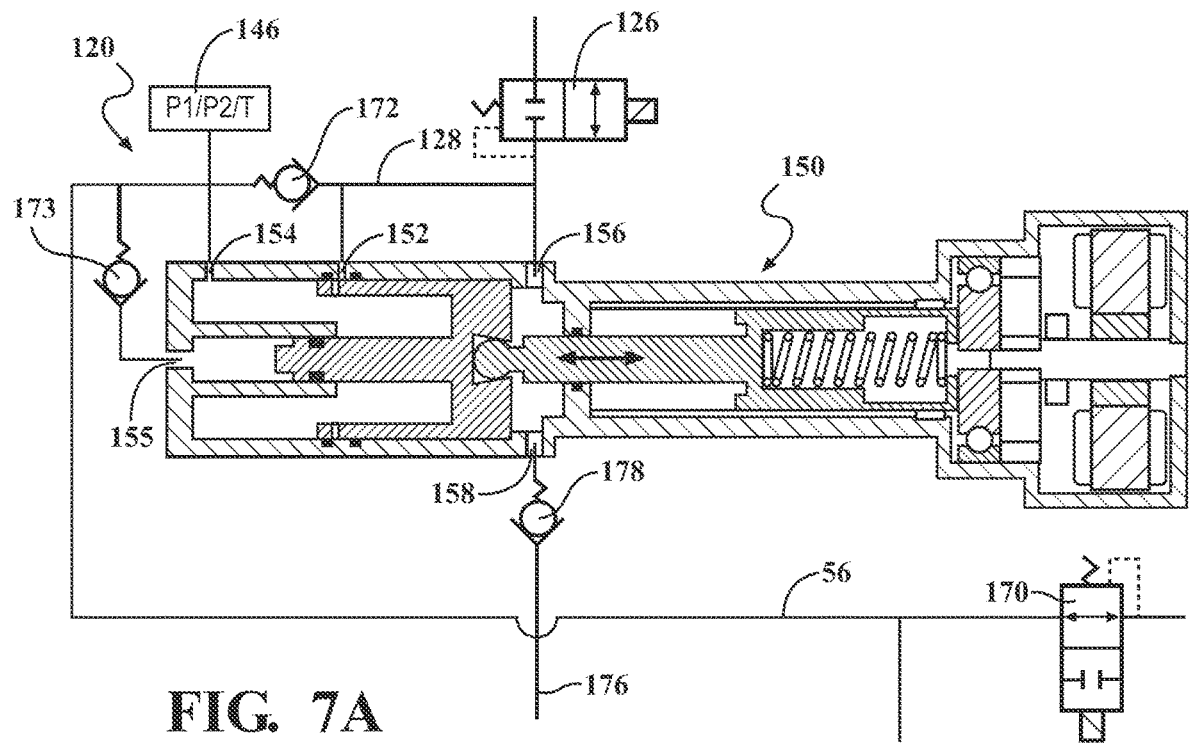
FIG. 7A shows a section of the schematic diagram of the first brake-by-wire system of FIG. 4, indicating details of the PSU.

FIG. 7A shows a section of the schematic diagram of the first BbW system 120 system of FIG. 4, indicating details of the dual-circuit PSU 150. The first BbW system 120 design is unique and adds a degree of safety to the brake system in that there is always fluid behind the PSU piston_160. This virtually eliminates the leakage concern of seal failure. When the PSU piston 160 displaces to the left (i.e. during a discharge stroke), the PRIV 126 is opened, and fluid can enter the second chamber 226 via the fourth fluid port 156. Fluid can also enter the second chamber 226 via the a fifth fluid port 158 and sixth check valve 178. During replenishment (i.e. when the PSU piston 160 moves to the right), the PRIV 126 is closed, sealing the second chamber 226 behind the PSU piston 160. When the actuator rod 208 retracts, the PSU piston 160 is pulled away from the terminal end 228, which in turn pushes the fluid out of the fourth fluid port 156 into the second fluid port 154 and the third fluid ports 155, all the while maintaining system pressure since the areas on both sides of the piston are equal.

Figure 7B:
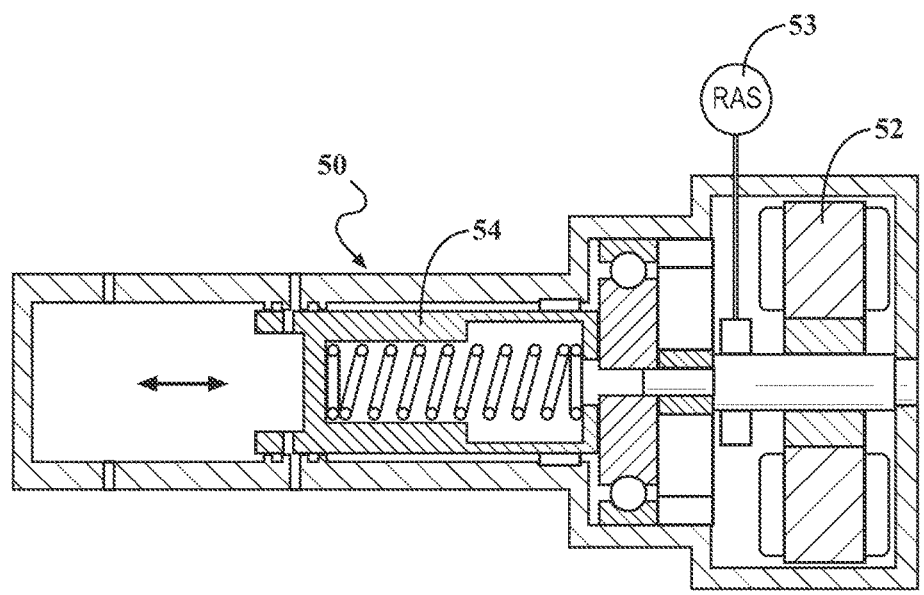
FIG. 7B shows a section of the schematic diagram of the 12-value brake-by-wire system of FIG. 3, indicating details of the PSU.

FIG. 7B shows a section of the schematic diagram of the H-bridge BbW system 20a of FIG. 3, indicating details of the PSU 50. The 12-value BbW system 20b may incorporate a PSU 50 having a similar or identical design having fluid on only one side of the piston. Such a dry-piston PSU can suffer from fluid leaking past the PSU piston seals into the motor assembly. Furthermore, to establish replenishment, the PSU outlet valves must be closed, and a vacuum created in order to allow fluid to enter into the PSU bore. This creates further concern for air ingestion. Finally, should there be a ballscrew failure, the PSU piston will only travel the displacement equivalent of the pushrod piston before being hydraulically locked into place.

Figure 8A:
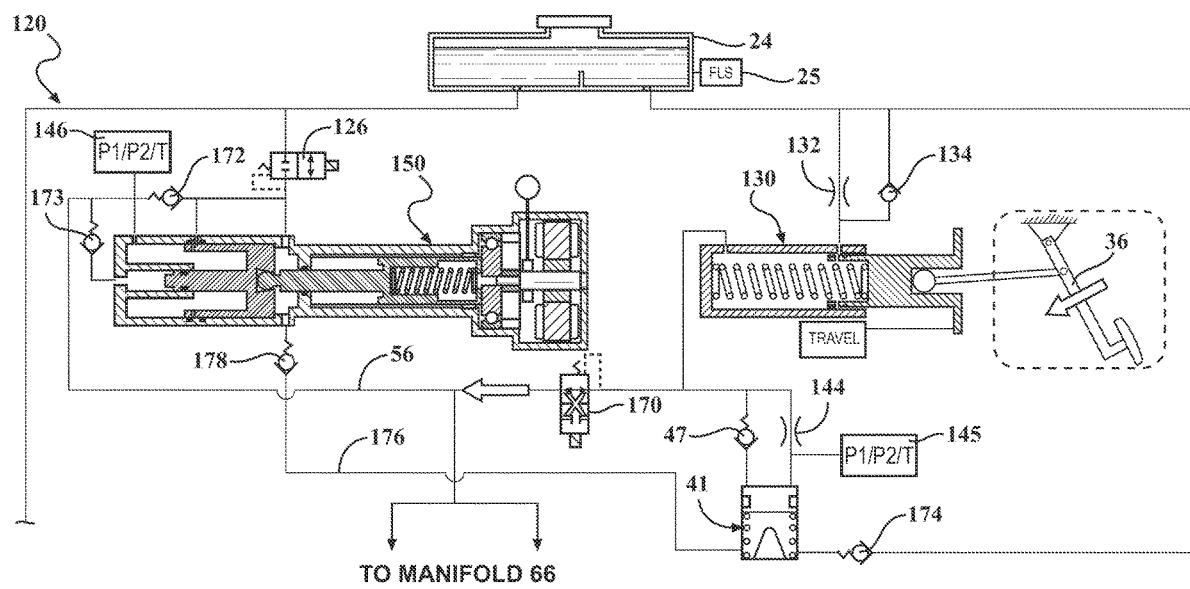
FIG. 8A shows a section of the schematic diagram of the first brake-by-wire system of FIG. 4.
Figure 8B:
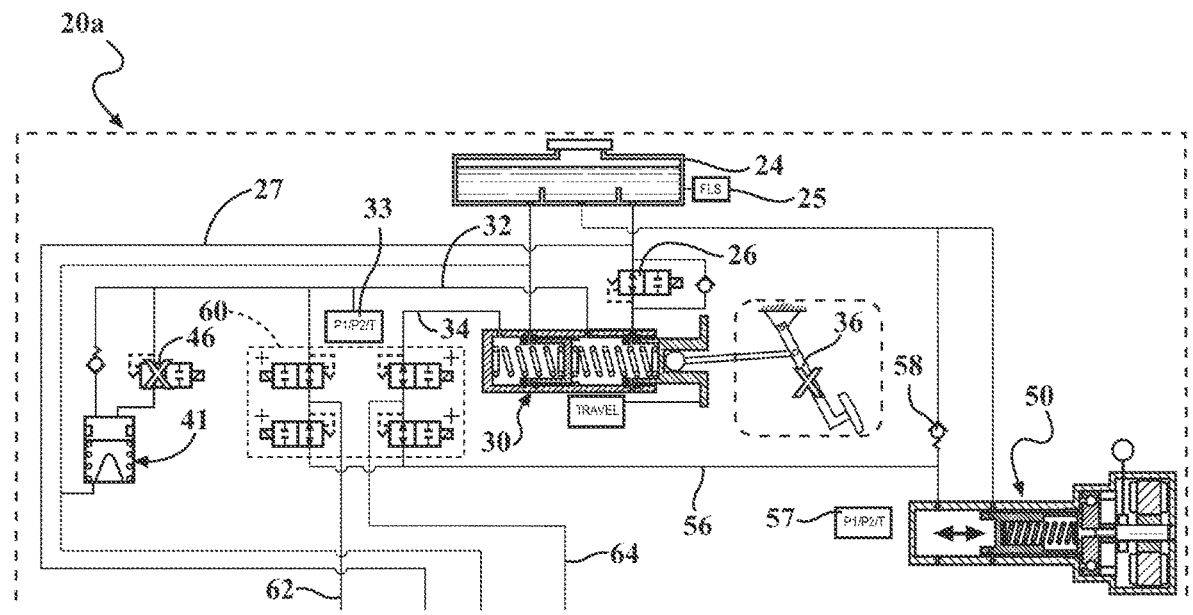
FIG. 8B shows a section of the schematic diagram of the H-bridge type brake-by-wire system of FIG. 2, indicating a faulty PFE isolation valve.
Figure 8C:
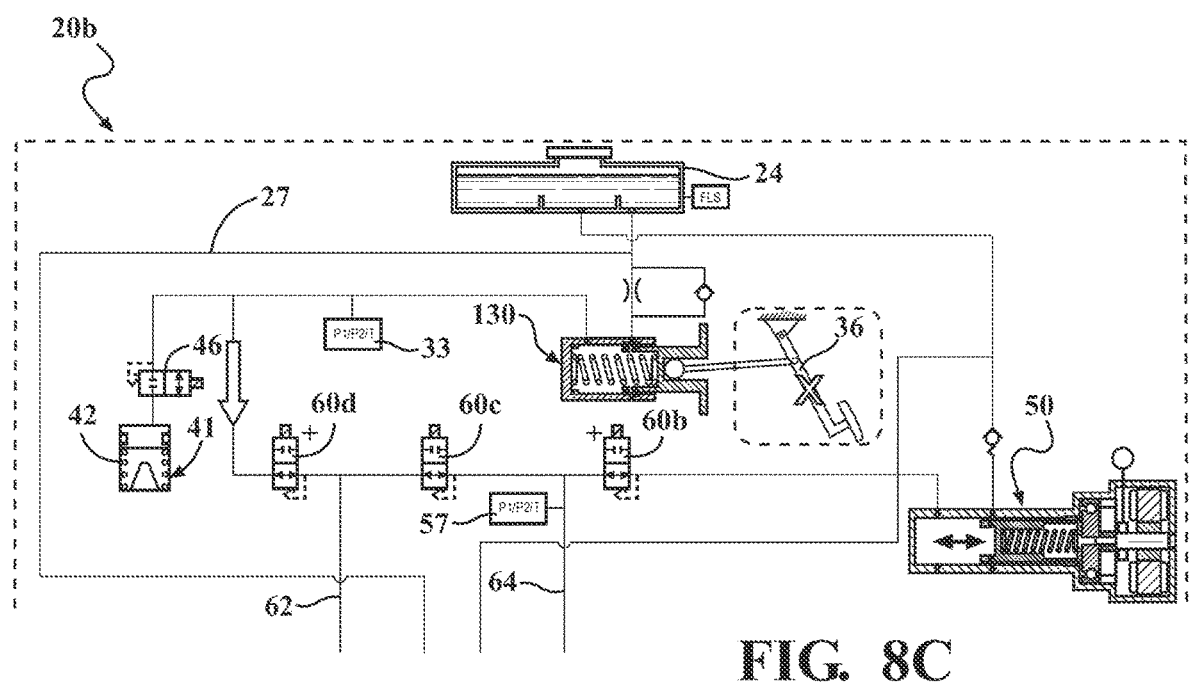
FIG. 8C shows a section of the schematic diagram of the 12-value brake-by-wire system of FIG. 3, indicating a faulty PFE isolation valve.

FIG. 8A shows a section of the schematic diagram of the first BbW system 120 of FIG. 4. FIG. 8B shows a section of the schematic diagram of the H-bridge BbW system 20a of FIG. 2, indicating a faulty PFE isolation valve. FIG. 8C shows a section of the schematic diagram of the 12-value BbW system 20b of FIG. 3, indicating a faulty PFE isolation valve. FIGS. 8A-8C illustrate another area where the first BbW system 120 design is inherently safer is for initiation of brake-by-wire mode. In the H-bridge BbW system 20a, and the 12-value BbW system 20b, the pedal feel emulator (PFE) is locked out by a normally-closed valve for fallback mode operation. If the other control valves all operate properly (blocking master cylinder flow to the wheel brakes) and the PFE isolation valve fails to open, then the pedal may be locked, and therefore unable to transmit travel information to the ECU, potentially resulting in failed brakes. The first BbW system 120 of the present disclosure does not require a PFE isolation valve because of its unique balanced piston design. Thus, brake pedal displacement is guaranteed each brake apply and the pedal lockout problem is eliminated.

Figure 9:
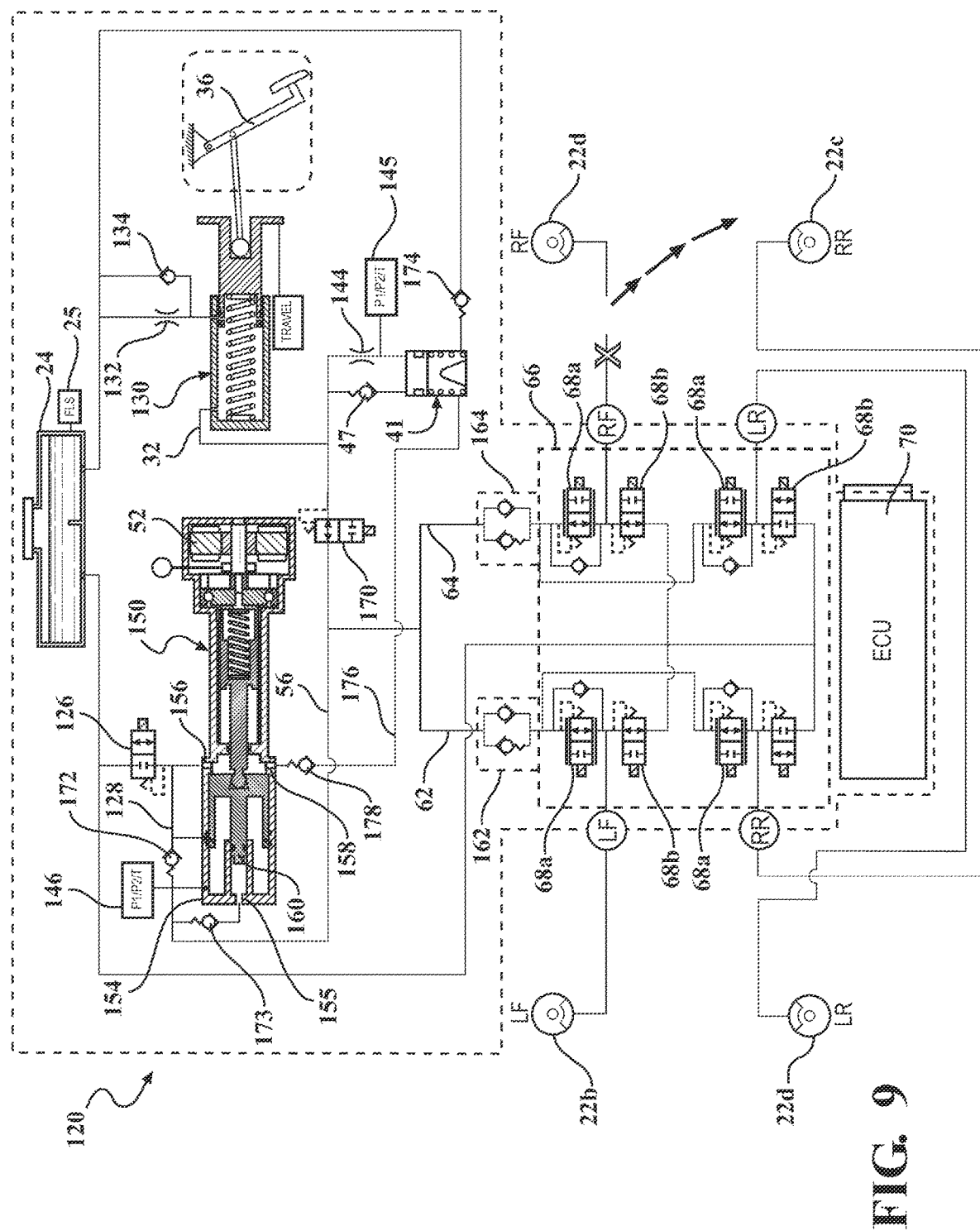
FIG. 9 shows a schematic diagram of the first brake-by-wire system of FIG. 4, indicating a leak in a brake line to the right-front wheel brake.

FIG. 9 shows a schematic diagram of the first BbW system 120 of FIG. 4, indicating a leak in a brake line to the right-front wheel brake. This illustrates a main purpose of the dual check valves in the main brake system is to prevent long term (e.g. overnight) leakage of the brake system should a leak be present such as a faulty brake hose. The check valves require a small pressure differential to actuate, which is sufficient to prevent leakage from the effects of gravity. This adds another measure of safety to a system using a single master cylinder circuit for backup. In other words, each of the bi-directional check valves 162, 164 may prevent fluid from flowing therethrough, unless there the differential pressure thereacross is greater than a predetermined pressure value. In cases of a leak, the differential pressure across a corresponding one of the of the bi-directional check valves 162, 164 may fall below the predetermined value, after which the corresponding bi-directional check valve 162, 164 blocks the flow, preventing further leakage.

Figure 10:
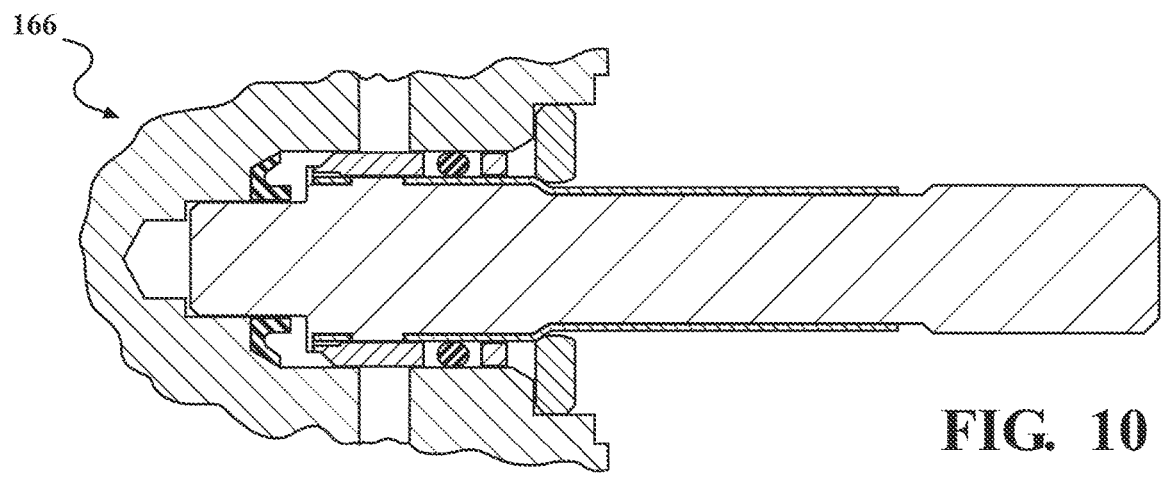
FIG. 10 shows a cut-away diagram of a release valve.
Figure 11:
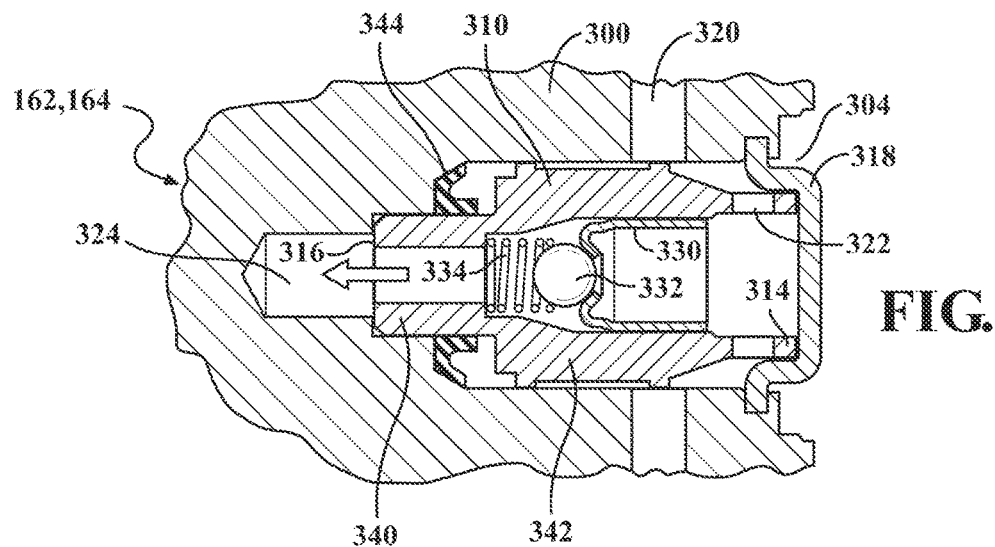
FIG. 11 shows a cut-away diagram of a check valve in accordance with an aspect of the present disclosure.
Figure 12:
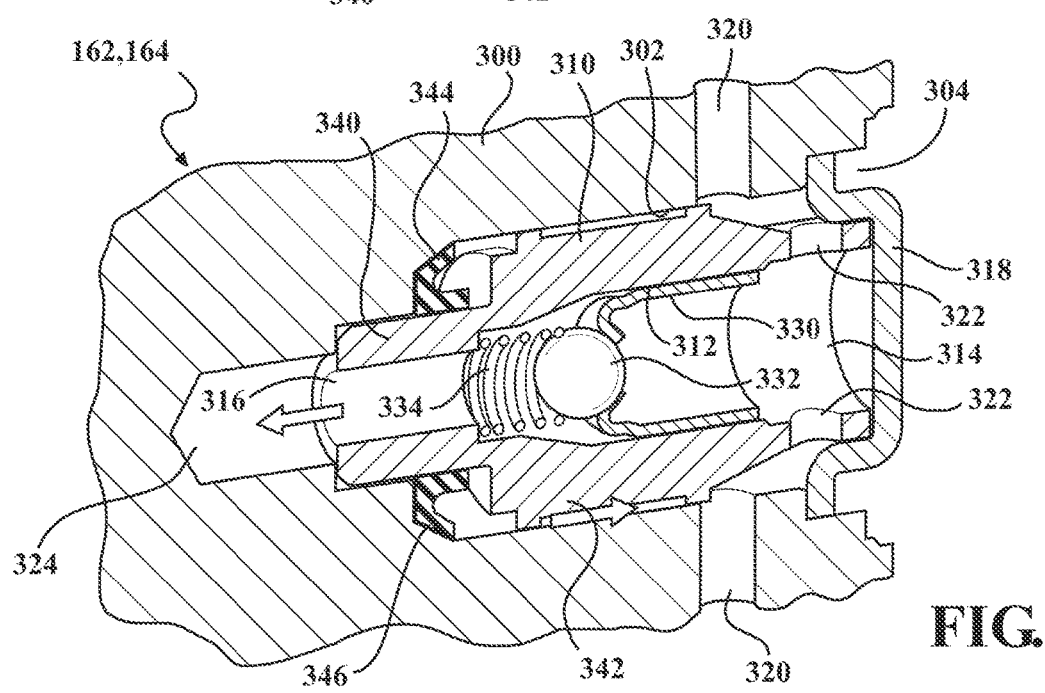
FIG. 12 shows a perspective cut-away view of the check valve of FIG. 11.

FIG. 10 shows a cut-away diagram of a release valve 166. The release valve 166 may be a conventional design. FIG. 11 shows a cut-away diagram of a bi-directional check valve 162, 164 that may use many of the same tooling and components as the release valve 166 shown in FIG. 10. FIG. 12 shows a perspective cut-away view of the bi-directional check valve 162, 164.

A block 300 defines a valve bore 302 from an open end 304. A valve core 310 is disposed within the valve bore 302. The valve core 310 is generally tubular and defines an interior passage 312 extending axially therethrough between a first end 314 and a second end 316. A cap 318 encloses the open end 304, holding the valve core 310 within the valve bore 302. The block 300 defines a first fluid passage 320 that is in fluid communication with a first end 314 of the interior passage 312 via first holes 322 in the valve core 310. The block 300 also defines a second fluid passage 324 that is aligned with and in fluid communication with the second end 316 of the valve core 310. A ball seal 330, ball 332, and spring 334 are disposed within the valve bore 302, forming a first check valve to allow fluid flow through the interior passage 312 of the valve core 310 from the first fluid passage 320 to the second fluid passage 324, while preventing fluid flow in an opposite direction. The valve core 310 includes a smaller portion 340 adjacent to the second end 316, and a wider portion 342 spaced apart from the second end 316 toward the first end 314. A lip seal 344 is disposed around the smaller portion 340 of the valve core 310 and engaging a corresponding shoulder 346 formed in the block 300. The lip seal 344 functions as a second check valve, allowing fluid to flow around a periphery of the valve core 310 from the second fluid passage 324 to the first fluid passage 320, while preventing fluid flow in an opposite direction.

Figure 13:
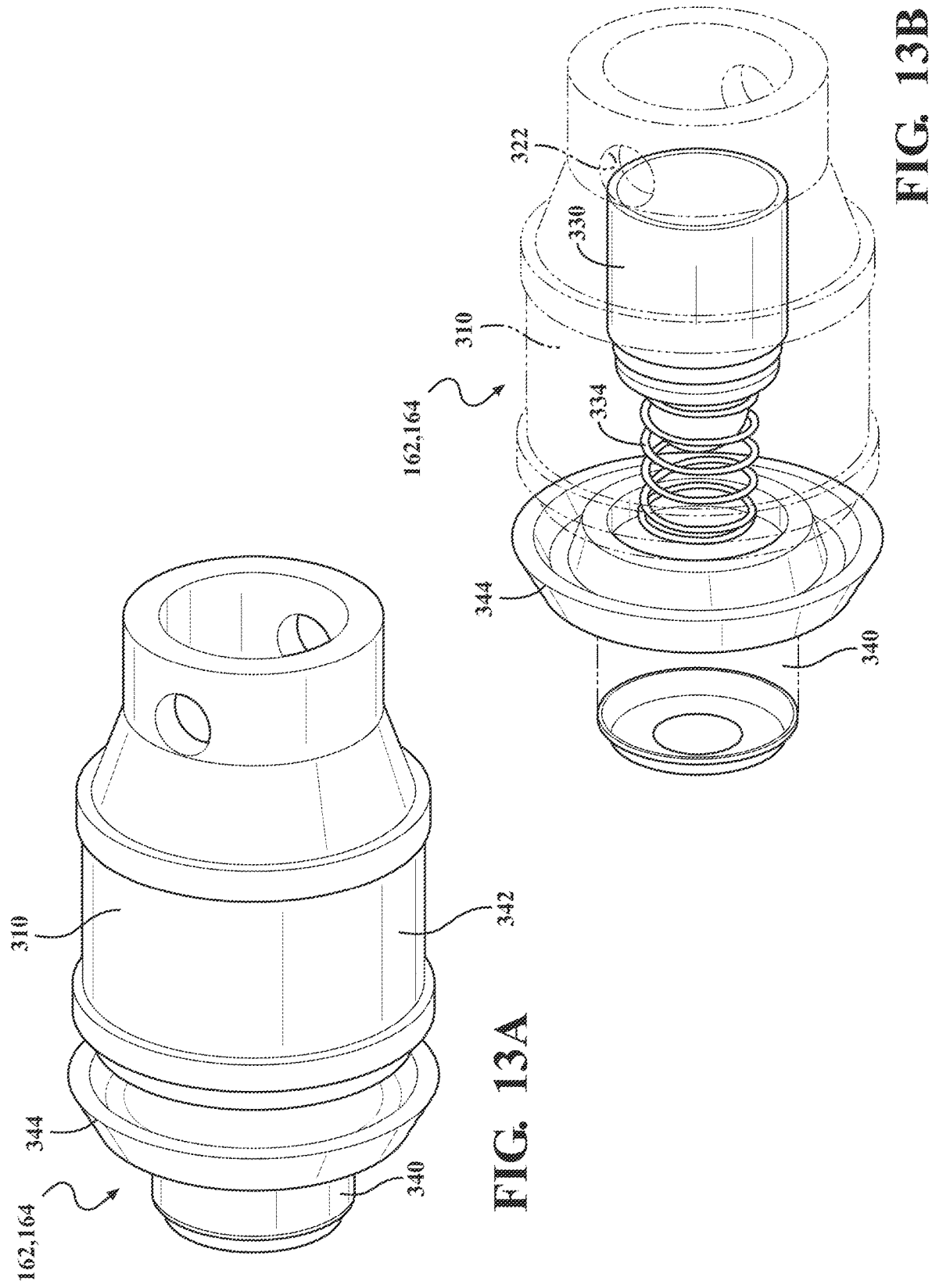
FIG. 13A shows a perspective view of a core of the check valve of FIG. 11.
FIG. 13B shows a perspective view of the core of FIG. 13A, with a partially-transparent valve housing.

FIGS. 13A and 13B show additional views of the core of the bi-directional check valve 162, 164.

Figure 14:
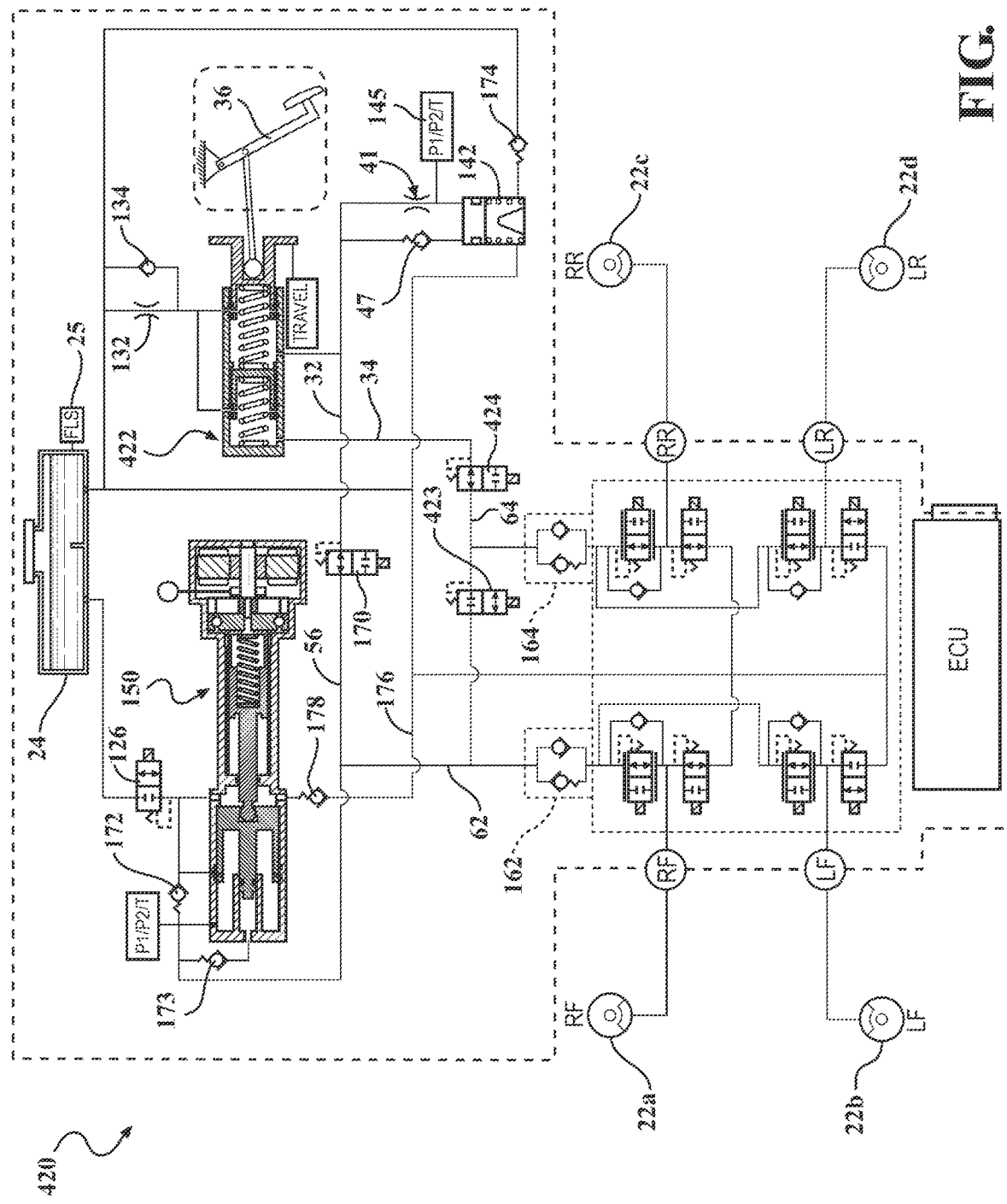
FIG. 14 shows a schematic diagram of a brake-by-wire system of the present disclosure.

FIG. 14 shows a schematic diagram of a second BbW system 420 of the present disclosure. The second BbW system 420 may be similar or identical to the first BbW system 120, with a couple of differences discussed herein. This second BbW system 420 variation offers the additional safety benefit of a 2-circuit master cylinder 422 having a first circuit and a second circuit. The first circuit of the 2-circuit master cylinder 422 is configured to supply fluid to the first brake circuit 62 via the first MC fluid passageway 32 and the PSU fluid passageway 56. The second circuit of the 2-circuit master cylinder 422 is configured to supply fluid to the second brake circuit 64 via the second MC fluid passageway 34. A master cylinder isolation valve (MCIV) 170, which is a normally-open valve, selectively controls fluid communication between the first MC fluid passageway 32 and the PSU fluid passageway 56. A circuit isolation valve 423, which is a normally-closed valve, selectively controls fluid communication between the two brake circuits 62, 64. The circuit isolation valve 423 may also be called a primary/secondary circuit isolation valve. A secondary MC isolation valve 424, which is a normally-open valve, selectively controls fluid communication between the second MC fluid passageway 34 and the second brake circuit 64.

The addition of these components 422, 423, 424 may provide another layer of safety in that positive failure mode management for leak isolation at a wheel brake is no longer required, and the system will fall back to a half system even in case of a dual failure of a leak and an electrical shut down. Otherwise, the same additional safety benefits of the first BbW system 120 are realized, with its balanced PSU piston eliminating leakage concerns and/or air ingestion.

Figure 15:
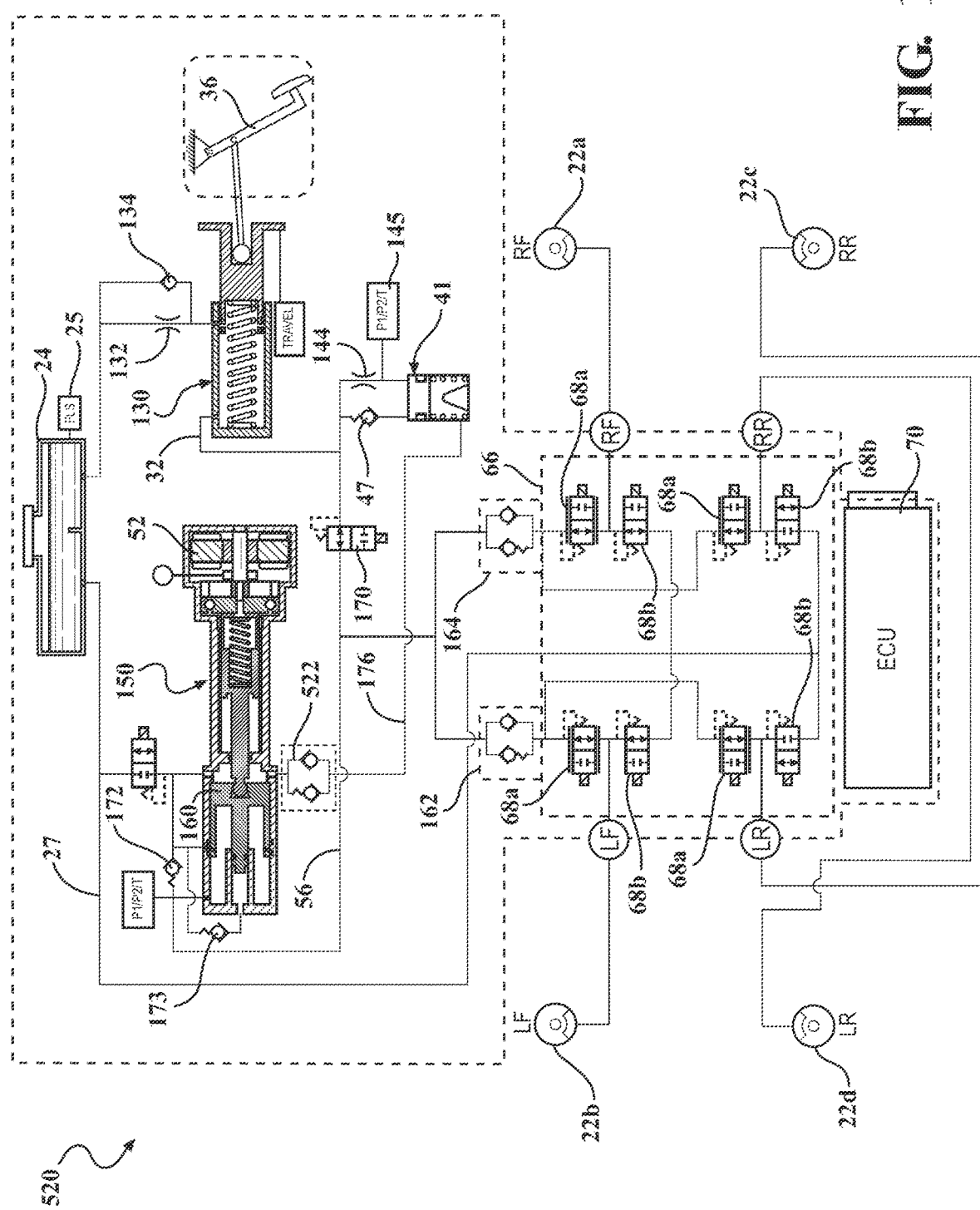
FIG. 15 shows a schematic diagram of a brake-by-wire system of the present disclosure.

FIG. 15 shows a schematic diagram of third BbW system 520 of the present disclosure. The third BbW system 520 may be similar or identical to the first BbW system 120, with a couple of differences discussed herein. This design variation is slightly different than the others in that it requires the removal of the bypass check valves from the ABS apply valves 68a. This may require that the valve internal return spring in each of the ABS apply valves 68a to be increased to avoid self-closure on relief by the Bernoulli effect. However, the benefit of this change means the PSU outlet circuit can be completely isolated during a regeneration cycle and pull fluid directly from the fluid reservoir 24. The added safety benefit is that there is still fluid captured behind the PSU piston 160 in event of a mechanical failure, which is why the design is now called "fluid balanced," This also virtually eliminates concern for air ingestion as well. If the electric motor 52 fails, the single-circuit master cylinder 130 will supply fluid directly to the wheel brakes 22a-22d. Any displacement of the PFE 41 will be recovered from the fluid entering from behind the PSU piston 160. A bi-directional check valve 522 may take the place of the sixth check valve 178 between the dual-circuit PSU 150 and the lower chamber 42b of the PFE 41. This permits fluid flow in both directions between the dual-circuit PSU 150 and the lower chamber 42b of the PFE 41. This assures that lower chamber 42b remains full of fluid since retraction of PSU piston 240 after a brake application can force fluid back into the PFE 41 lower chamber 42b.

Figure 16:
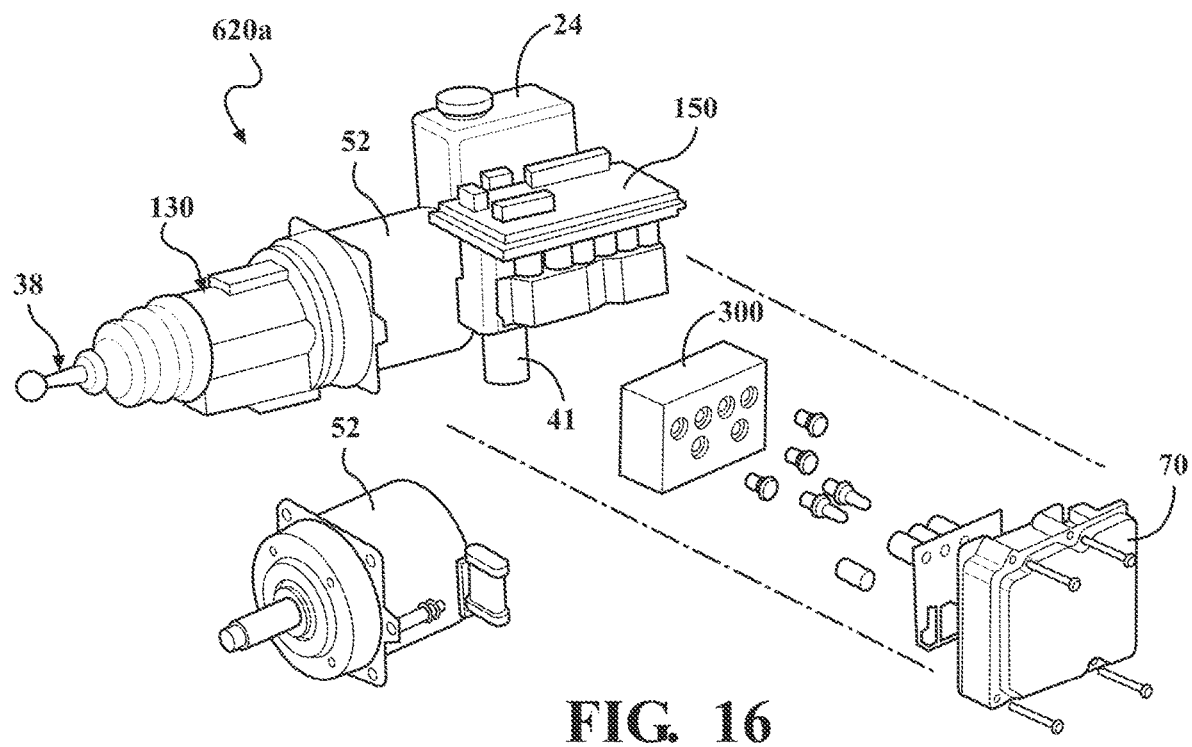
FIG. 16 shows a one-box brake-by-wire device having an axial configuration, with the PSU axially aligned with the master brake cylinder.
Figure 17:
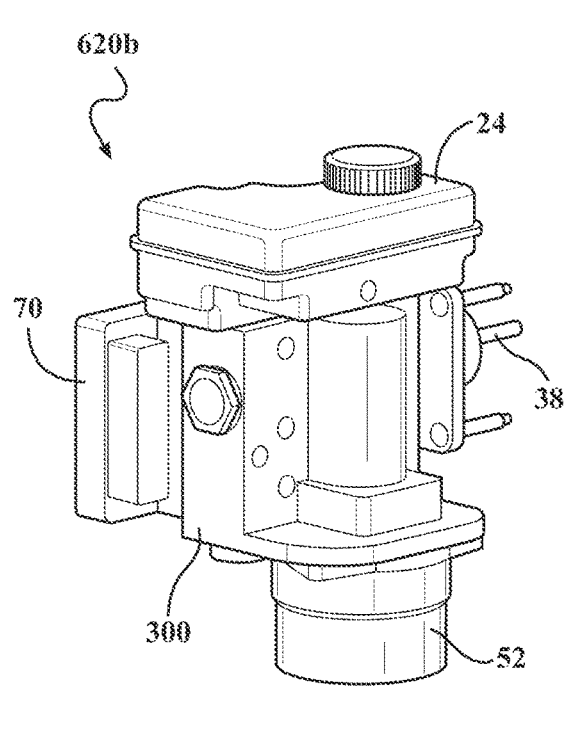
FIG. 17 shows a one-box brake-by-wire device with a motor-down configuration.
Figure 18:
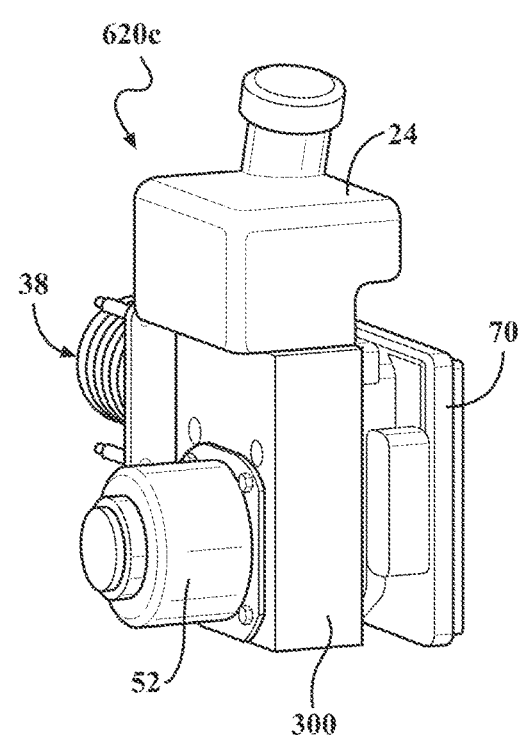
FIG. 18 shows a one-box brake-by-wire device with a transverse motor configuration.

The BbW systems 120, 420, 520 may be packaged in any configuration. For example, any of the BbW systems 120, 420, 520 may have an axial configuration 620a, with the PSU axially aligned with the master brake cylinder, as shown in FIG. 16. Additionally or alternatively, any of the BbW systems 120, 420, 520 may have a motor-down configuration 620b, as shown in FIG. 17. Additionally or alternatively, any of the BbW systems 120, 420, 520 may be configured with a transverse motor configuration 620c, with the electric motor 52 having a motor shaft that extends transverse to the master brake cylinder, as shown in FIG. 18.

According to an aspect of the disclosure, a brake system for motor vehicles in a brake-by-wire operating mode can be activated both by a vehicle driver in the normal brake-by-wire operating mode and can also be operated by the same driver in at least one fallback operating mode in which only operation of the brake system by the vehicle driver is possible.

The brake system includes a brake pedal for actuating a brake master cylinder having a housing and a single piston and which defines a single pressure chamber which is subsequently connected to the wheel brakes, wherein an actuating force exerted by the brake pedal is exerted on the single piston upon actuation of the brake system by the vehicle driver and the piston is positioned in a starting position by a return spring when the brake pedal is not actuated.

The brake system also includes a pressure medium reservoir for a pressure medium which is exposed to atmospheric pressure and has a reservoir chamber associated with the pressure chamber; a travel detection device which detects the actuation travel of the brake pedal or at least the piston connected to the brake pedal; and a pedal feel emulator which conveys a desired haptic brake pedal feel to the vehicle driver in the brake-by-wire mode, being connected hydraulically directly to the master cylinder pressure chamber.

The brake system also includes an electrically controllable pressure supply unit which delivers a brake system pressure and consists of a piston sealed to the main housing bore displaced by an independently actuated push rod on one end to supply brake system pressure which is also sealed to the main housing in a corresponding bore and an extending rod on the other side that is part of the main piston and is sized exactly as the push rod and sealed in a separate bore proportional to its size such as when the piston and push rod displace, equal volumes of fluid are displaced on both sides.

The brake system also includes a fluid connection between the bore of the extending rod and the main system pressure path with a check valve assembly dividing the two area with said check valve permitting flow from the bore of the extending rod to the main system pressure path; a master cylinder isolation valve for isolating the master cylinder from the brake circuit; a pressure supply unit reservoir isolation valve for isolating the push rod side of the electrically controllable pressure source to the reservoir; a forward flow and reverse flow check valve in parallel to each other and located between the pressure supply unit and two of the wheel brakes with a second forward flow and reverse flow check valve in parallel to each other and located between the pressure supply unit and the remaining two-wheel brakes; and an inlet valve and outlet valve for each of the wheel brakes for setting wheel-individual brake pressures which are derived from signals generated by the electronic control unit, where the inlet valves transmit fluid to the wheel brakes in an unactivated state and limit or prevent a build-up of wheel pressure in an activated state and the outlet valves prevent an outflow of the pressure medium from the wheel brakes to the reservoir in an unactivated state and permit and control the outflow in an activated state, the inlet valves being closed, so that a reduction in wheel brake pressure takes place.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electro-hydraulic brake system comprising:
   a master cylinder (MC) fluidly coupled to a first MC fluid passageway and configured to supply fluid into the first MC fluid passageway in response to pressing force on a brake pedal coupled thereto;
   a pressure supply unit (PSU) including an electric motor coupled to an actuator rod, a piston bore including a terminal end opposite the electric motor, and a PSU piston disposed within the piston bore and movable by the actuator rod through the piston bore and dividing the piston bore into a first chamber and a second chamber;
   an inner cylinder within the piston bore and extending from the terminal end and defining a balance bore;
   the PSU piston including a balance piston extending into the balance bore and having a cross-sectional area equal to a cross-sectional area of the actuator rod;
   a check valve configured to allow fluid flow from the second chamber of the PSU to the first chamber of the PSU and to block fluid flow in an opposite direction;
   a pedal feel emulator (PFE) including a PFE piston movable through a PFE bore and separating an upper chamber from a lower chamber;
   wherein the lower chamber of the PFE is fluidly coupled to the second chamber of the PSU to convey fluid from the lower chamber of the PFE to the second chamber of the PSU in response to a compression of the PFE; and
   wherein the first MC fluid passageway is fluidly coupled to the upper chamber of the PFE to provide a fluid path from the master cylinder into the upper chamber of the PFE.

2. The electro-hydraulic brake system of claim 1, further comprising:
   at least one brake circuit configured to transmit fluid from the PSU to at least one wheel brake;
   a control valve manifold including at least one of an apply valve and a release valve for controlling fluid flow between the at least one brake circuit and the at least one wheel brake;
   wherein the pressure supply unit includes a supply port and is configured to discharge fluid therefrom; and
   wherein the supply port is in fluid communication with the control valve manifold via the at least one brake circuit and without any actuated valves therebetween.

3. The electro-hydraulic brake system of claim 1, further comprising a check valve disposed between the lower chamber of the PFE and the second chamber of the PSU and configured to allow fluid flow from the lower chamber of the PFE to the second chamber of the PSU, while blocking fluid flow in an opposite direction.

4. The electro-hydraulic brake system of claim 1, further comprising:
   a PSU fluid passageway in fluid communication with the first chamber of the pressure supply unit and in fluid communication with a plurality of wheel brakes for supplying pressurized fluid thereto; and
   an isolation valve providing selective fluid communication between the first MC fluid passageway and the PSU fluid passageway.

5. The electro-hydraulic brake system of claim 1, wherein the master cylinder is a 2-circuit master cylinder fluidly coupled to a second MC fluid passageway fluidly isolated from the first MC fluid passageway, the 2-circuit master cylinder configured to supply fluid into each of the first MC fluid passageway and the second MC fluid passageway in response to the pressing force on the brake pedal coupled thereto; and further comprising:
   a secondary MC isolation valve configured to selectively control fluid communication between the second MC fluid passageway and at least one brake circuit including at least one wheel brake.

6. The electro-hydraulic brake system of claim 5, wherein the at least one brake circuit includes a first brake circuit and a second brake circuit; and further comprising a circuit isolation valve configured to selectively control fluid communication between the first brake circuit and the second brake circuit.

7. The electro-hydraulic brake system of claim 1, further comprising a bi-directional check valve packaged in a single bore and disposed between the lower chamber of the PFE and the second chamber of the PSU and configured to allow fluid flow in either of two opposite directions therebetween only when a differential pressure thereacross is above a predetermined amount.

8. The electro-hydraulic brake system of claim 7, further comprising a fluid reservoir holding brake fluid; and
   wherein the lower chamber of the PFE is only connected to the fluid reservoir through the bi-directional check valve.

9. The electro-hydraulic brake system of claim 1, further comprising:
   a PSU fluid passageway in fluid communication with the first chamber of the pressure supply unit for supplying pressurized fluid to at least one wheel brake;
   a control valve manifold including at least one of an apply valve and a release valve for controlling fluid flow between the PSU fluid passageway and the at least one wheel brake; and
   a bi-directional check valve disposed between PSU fluid passageway and the control valve manifold and configured to allow fluid flow in either of two opposite directions therebetween only when a differential pressure thereacross is above a predetermined amount.

10. An electro-hydraulic brake system comprising:
   a single-circuit master cylinder (MC) having a single piston and fluidly coupled to a MC fluid passageway and configured to supply fluid into the MC fluid passageway in response to pressing force on a brake pedal coupled thereto;
   a pressure supply unit (PSU) including an electric motor and a PSU piston disposed within a piston bore, the PSU piston being movable through the piston bore by the electric motor and dividing the piston bore into a first chamber and a second chamber, the piston bore including a terminal end opposite the electric motor;
   a PSU fluid passageway for conveying fluid from the pressure supply unit to at least one wheel brake;
   the PSU including a first supply port in fluid communication with the first chamber for conveying fluid therefrom and to the PSU fluid passageway in response to the PSU piston moving through the piston bore toward the terminal end; and
   the PSU including a second supply port in fluid communication with the second chamber for discharging fluid therefrom and to the PSU fluid passageway in response to the PSU piston moving through the piston bore away from the terminal end,
   wherein the electro-hydraulic brake system further comprises:
   an inner cylinder within the piston bore and extending from the terminal end and defining a balance bore; and
   the PSU piston including a balance piston extending through the first chamber and into the balance bore,
   wherein the electro-hydraulic brake system further comprises: a third supply port in fluid communication with the balance bore for discharging fluid therefrom and to the PSU fluid passageway in response to the PSU piston moving through the piston bore toward the terminal end.

11. The electro-hydraulic brake system of claim 10, further comprising:
   at least one brake circuit configured to transmit fluid from the PSU to at least one wheel brake;
   a control valve manifold including at least one of an apply valve and a release valve for controlling fluid flow between the at least one brake circuit and the at least one wheel brake;
   and
   wherein the first supply port and the second supply port are in fluid communication with the control valve manifold via the at least one brake circuit and without any actuated valves therebetween.

* * * * *